US012718755B2

(12) United States Patent
Xu et al.

(10) Patent No.: US 12,718,755 B2
(45) Date of Patent: Aug. 25, 2026

(54) DISPLAY PANEL AND METHOD FOR DRIVING PIXEL CIRCUIT, AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Yuanjie Xu, Beijing (CN); Taofeng Xie, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/266,576

(22) PCT Filed: Apr. 21, 2022

(86) PCT No.: PCT/CN2022/088098
§ 371 (c)(1),
(2) Date: Jun. 9, 2023

(87) PCT Pub. No.: WO2023/201609
PCT Pub. Date: Oct. 26, 2023

(65) Prior Publication Data
US 2025/0140183 A1 May 1, 2025

(51) Int. Cl.
*G09G 3/3233* (2016.01)
*H04N 25/771* (2023.01)

(52) U.S. Cl.
CPC ... *G09G 3/3233* (2013.01); *G09G 2300/0426* (2013.01); *G09G 2300/0804* (2013.01);
(Continued)

(58) Field of Classification Search
CPC ... G09G 3/30–3291; G09G 2300/0426; G09G 2300/0804; G09G 2300/0819;
(Continued)

(56) References Cited

U.S. PATENT DOCUMENTS

2016/0125809 A1* 5/2016 Hwang ................ G09G 3/3258 345/212
2018/0075804 A1* 3/2018 Kim ..................... G09G 3/3233
(Continued)

FOREIGN PATENT DOCUMENTS

CN 108288621 A * 7/2018 ......... H01L 27/1214
CN 113380190 A 9/2021
(Continued)

OTHER PUBLICATIONS

Translation for CN113409727A (Year: 2021).*

*Primary Examiner* — Roberto W Flores
(74) *Attorney, Agent, or Firm* — IPro, PLLC

(57) ABSTRACT

Provided is a display panel. The display panel includes: a substrate, comprising a first display region and a second display region, wherein the first display region at least partially surrounds the second display region; a plurality of transparent conductive wires, disposed in the first display region and the second display region; wherein the first pixel circuit and the first light-emitting element are disposed in the first display region; a plurality of second pixels, the second pixel comprising a second pixel circuit and a second light-emitting element, wherein the second pixel circuit is disposed in the first display region, the second light-emitting element is disposed in the second display region.

14 Claims, 12 Drawing Sheets

(52) U.S. Cl.
CPC ............... *G09G 2300/0819* (2013.01); *G09G 2300/0842* (2013.01); *G09G 2310/08* (2013.01); *G09G 2320/0233* (2013.01); *G09G 2320/0252* (2013.01); *G09G 2320/0626* (2013.01); *G09G 2360/145* (2013.01); *H04N 25/771* (2023.01)

(58) Field of Classification Search
CPC ....... G09G 2300/0842; G09G 2310/08; G09G 2320/0233; G09G 2320/0252; G09G 2320/0626; G09G 2360/145; H10K 59/65; H10K 59/123; H10K 59/131; H04N 25/771
See application file for complete search history.

(56) References Cited

U.S. PATENT DOCUMENTS

| | | | | |
|---|---|---|---|---|
| 2021/0158751 | A1 | 5/2021 | Cha et al. | |
| 2021/0201762 | A1 | 7/2021 | He | |
| 2021/0359063 | A1* | 11/2021 | Lu | H10D 86/481 |
| 2021/0390905 | A1 | 12/2021 | Kim | |
| 2022/0208099 | A1* | 6/2022 | Liu | G09G 3/3258 |
| 2022/0366847 | A1* | 11/2022 | An | G09G 3/2003 |

FOREIGN PATENT DOCUMENTS

| | | | |
|---|---|---|---|
| CN | 113409727 | A | 9/2021 |
| CN | 113793864 | A | 12/2021 |
| CN | 113823210 | A | 12/2021 |

* cited by examiner

01

Active layer P1 of T11

Active layer P2 of T12

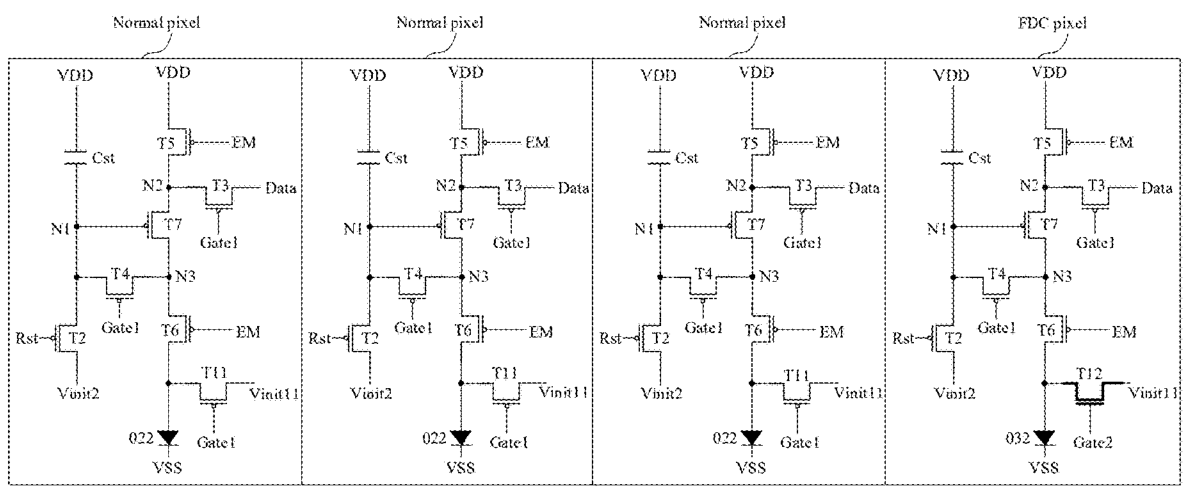

FIG. 13

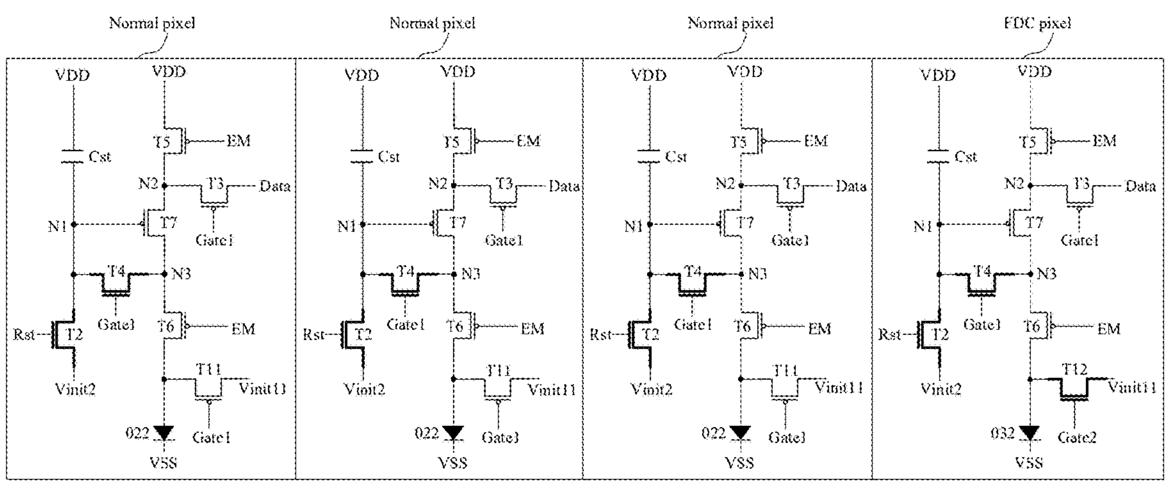

FIG. 14

In a first phase in which a potential of a first gate drive signal supplied by a first gate signal terminal and a potential of a second gate drive signal supplied by a second gate signal terminal are a first potential, in response to the first gate drive signal, transmitting, by the first pixel circuit, a reset power signal supplied by a first reset power terminal to a first light-emitting element to reset the first light-emitting element — 1501

In a second phase in which the potential of the first gate drive signal and the potential of the second gate drive signal are a second potential, in response to the second gate drive signal, transmitting, by the second pixel circuit, a reset power signal supplied by a second reset power terminal to a second light-emitting element to reset the second light-emitting element — 1502

FIG. 15

Figure 16:
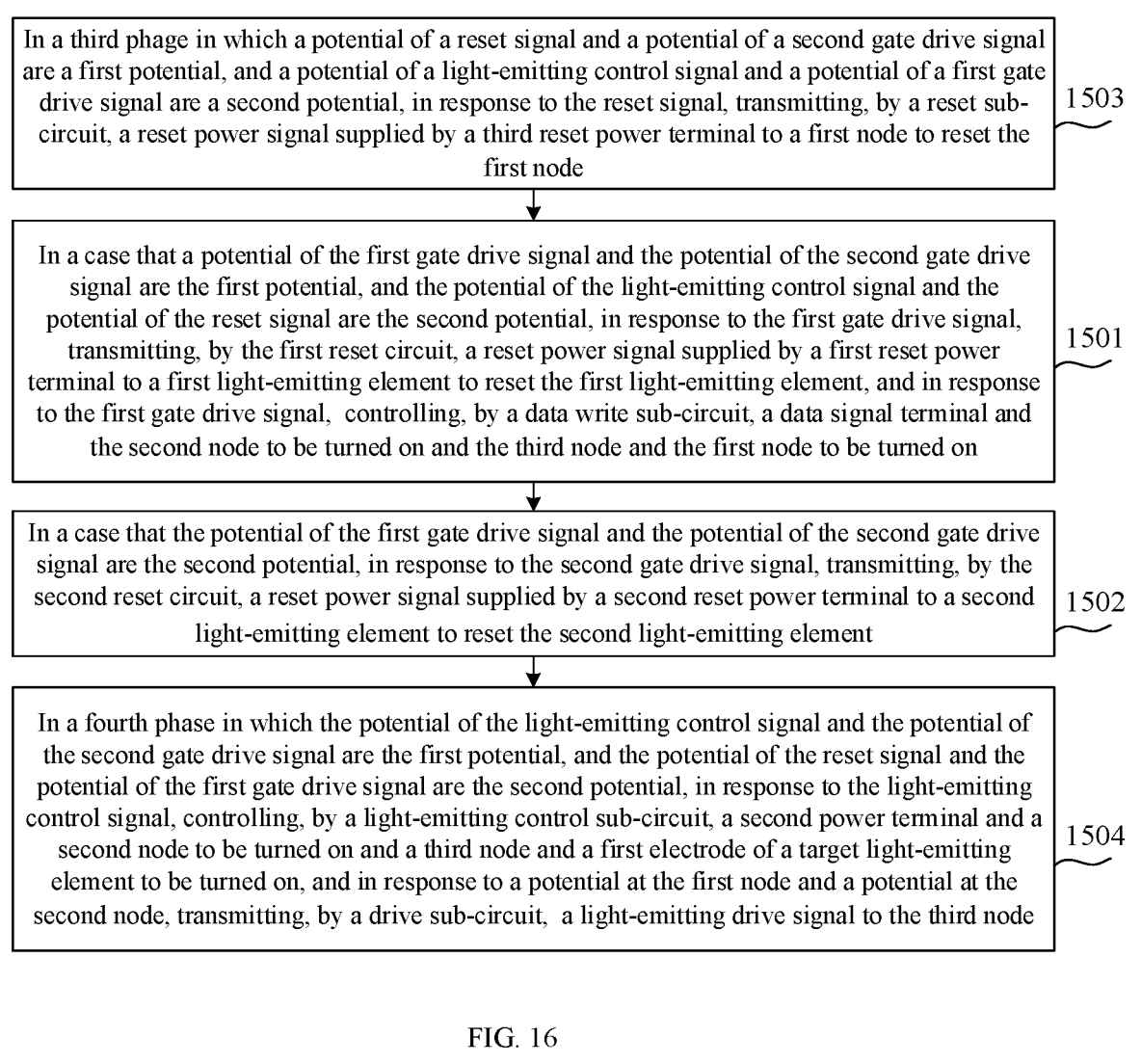

In a third phage in which a potential of a reset signal and a potential of a second gate drive signal are a first potential, and a potential of a light-emitting control signal and a potential of a first gate drive signal are a second potential, in response to the reset signal, transmitting, by a reset sub-circuit, a reset power signal supplied by a third reset power terminal to a first node to reset the first node

1503

In a case that a potential of the first gate drive signal and the potential of the second gate drive signal are the first potential, and the potential of the light-emitting control signal and the potential of the reset signal are the second potential, in response to the first gate drive signal, transmitting, by the first reset circuit, a reset power signal supplied by a first reset power terminal to a first light-emitting element to reset the first light-emitting element, and in response to the first gate drive signal, controlling, by a data write sub-circuit, a data signal terminal and the second node to be turned on and the third node and the first node to be turned on

1501

In a case that the potential of the first gate drive signal and the potential of the second gate drive signal are the second potential, in response to the second gate drive signal, transmitting, by the second reset circuit, a reset power signal supplied by a second reset power terminal to a second light-emitting element to reset the second light-emitting element

1502

In a fourth phase in which the potential of the light-emitting control signal and the potential of the second gate drive signal are the first potential, and the potential of the reset signal and the potential of the first gate drive signal are the second potential, in response to the light-emitting control signal, controlling, by a light-emitting control sub-circuit, a second power terminal and a second node to be turned on and a third node and a first electrode of a target light-emitting element to be turned on, and in response to a potential at the first node and a potential at the second node, transmitting, by a drive sub-circuit, a light-emitting drive signal to the third node

DISPLAY PANEL AND METHOD FOR DRIVING PIXEL CIRCUIT, AND DISPLAY DEVICE

CROSS-REFERENCE TO RELATED APPLICATION

This application is a U.S. national stage of international application No. PCT/CN2022/088098, filed on Apr. 21, 2022, the disclosure of which is herein incorporated by reference in its entirety.

TECHNICAL FIELD

The present disclosure relates to the field of display technologies, and in particular, relates to a display panel and a method for driving a pixel circuit, and a display device.

BACKGROUND OF THE INVENTION

A technology in which hardware structures, such as photosensitive sensors, acoustic sensors are hidden below a screen of the display device has become a novel technology for increasing a screen ratio of the display device.

SUMMARY OF THE INVENTION

Embodiments of the present disclosure provide a display panel and a method for driving a pixel circuit, and a display device. The technical solutions are as follows.

In some embodiments of the present disclosure, a display panel is provided. The display panel includes:

- a substrate, including a first display region and a second display region, wherein the first display region at least partially surrounds the second display region;
- a plurality of transparent conductive wires, disposed in the first display region and the second display region;
- a plurality of first pixels, the first pixel including a first pixel circuit and a first light-emitting element, wherein the first pixel circuit and the first light-emitting element are disposed in the first display region, the first pixel circuit is coupled to the first light-emitting element, a first gate signal terminal, and a first reset power terminal, and the first pixel circuit is configured to control, in response to a first gate drive signal supplied by the first gate signal terminal, the first reset power terminal to transmit a reset power signal to the first light-emitting element;
- a plurality of second pixels, the second pixel including a second pixel circuit and a second light-emitting element, wherein the second pixel circuit is disposed in the first display region, the second light-emitting element is disposed in the second display region, the second pixel circuit is coupled to the second light-emitting element via the transparent conductive wire and is further coupled to a second gate signal terminal and a second reset power terminal, the second pixel circuit is configured to control, in response to a second gate drive signal supplied by the second gate signal terminal, the second reset power terminal to transmit a reset power signal to the second light-emitting element;
- wherein a potential of the reset power signal transmitted to the first light-emitting element is less than a potential of the reset power signal transmitted to the second light-emitting element.

In some embodiments, the first reset power terminal and the second reset power terminal are a same reset power terminal.

In some embodiments, the first pixel circuit includes a first reset circuit and a first light-emitting drive circuit, and the second pixel circuit includes a second reset circuit and a second light-emitting drive circuit; wherein

- the first reset circuit is coupled to the first gate signal terminal, the first reset power terminal, and a first electrode of the first light-emitting element, and is configured to control, in response to the first gate drive signal, the first reset power terminal to transmit the reset power signal to the first electrode of the first light-emitting element;
- the first light-emitting drive circuit is coupled to the first gate signal terminal, a data signal terminal, and the first electrode of the first light-emitting element, and is configured to transmit, in response to the first gate drive signal and a data signal supplied by the data signal terminal, a light-emitting drive signal to the first electrode of the first light-emitting element to drive the first light-emitting element to emit light;
- the second reset circuit is coupled to the second gate signal terminal, the second reset power terminal, and a first electrode of the second light-emitting element, and is configured to control, in response to the second gate drive signal, the second reset power terminal to transmit the reset power signal to the first electrode of the second light-emitting element, wherein the first electrode of the first light-emitting element and the first electrode of the second light-emitting element are coupled to a first power terminal; and
- the second light-emitting drive circuit is coupled to the first gate signal terminal, the data signal terminal, and the first electrode of the second light-emitting element, and is configured to transmit, in response to the first gate drive signal and the data signal, a light-emitting drive signal to the first electrode of the second light-emitting element to drive the second light-emitting element to emit light.

In some embodiments, the first reset circuit includes a first reset transistor, and the second reset circuit includes a second reset transistor, wherein the first reset transistor and the second reset transistor are of different types; wherein

- a gate electrode of the first reset transistor is coupled to the first gate signal terminal, a first electrode of the first reset transistor is coupled to the first reset power terminal, and a second electrode of the first reset transistor is coupled to the first electrode of the first light-emitting element; and
- a gate electrode of the second reset transistor is coupled to the second gate signal terminal, a first electrode of the second reset transistor is coupled to the second reset power terminal, and a second electrode of the second reset transistor is coupled to the first electrode of the second light-emitting element.

In some embodiments, the first reset transistor is a P-type transistor, and the second reset transistor is an N-type transistor.

In some embodiments, the first reset transistor includes a first active layer, a first gate metal layer, and a first source-drain metal layer that are laminated in a direction away from the substrate, wherein the first active layer is coupled to the first source-drain metal layer; and

- the second reset transistor includes a second gate metal layer, a second active layer, a third gate metal layer, and a second source-drain metal layer that are laminated in the direction away from the substrate, wherein the second source-drain metal layer is coupled to the second active layer;

wherein the first source-drain metal layer and the second source-drain metal layer are disposed in a same layer, and the second gate metal layer is farther away from the substrate than the first gate metal layer.

In some embodiments, a material of the first active layer includes a low temperature poly-silicon material, and a material of the second active layer includes an oxide material.

In some embodiments, the first light-emitting drive circuit includes a first reset sub-circuit, a first data write sub-circuit, a first light-emitting control sub-circuit, a first storage sub-circuit, and a first drive sub-circuit, and the second light-emitting drive circuit includes a second reset sub-circuit, a second data write sub-circuit, a second light-emitting control sub-circuit, a second storage sub-circuit, and a second drive sub-circuit, wherein each of the first reset sub-circuit and the second reset sub-circuit is coupled to a reset signal terminal, a third reset power terminal, and a first node, and is configured to control, in response to a reset signal supplied by the reset signal terminal, the third reset power terminal and the first node to be turned on or turned off;

each of the first data write sub-circuit and the second data write sub-circuit is coupled to the first gate signal terminal, a data signal terminal, the first node, a second node, and a third node, and is configured to control, in response to the first gate drive signal, the data signal terminal and the second node to be turned on or turned off and the third node and the first node to be turned on or turned off;

each of the first light-emitting control sub-circuit and the second light-emitting control sub-circuit is coupled to a light-emitting control terminal, a second power terminal, the second node, the third node, and a first electrode of a target light-emitting element, and is configured to control, in response to a light-emitting control signal supplied by the light-emitting control terminal, the second power terminal and the second node to be turned on or turned off and the third node and the first electrode of the target light-emitting element to be turned on or turned off, a second electrode of the target light-emitting element is coupled to the second power terminal, the target light-emitting element in the first pixel circuit is the first light-emitting element, and the target light-emitting element in the second pixel circuit is the second light-emitting element;

each of the first storage sub-circuit and the second storage sub-circuit is coupled to the second power terminal and the first node, and is configured to store, in response to a second power signal supplied by the second power terminal, a potential at the first node; and each of the first drive sub-circuit and the second drive sub-circuit is coupled to the first node, the second node, and the third node, and is configured to transmit, in response to the potential at the first node and a potential at the second node, a light-emitting drive signal to the third node.

In some embodiments, each of the first reset sub-circuit and the second reset sub-circuit includes a third reset transistor, each of the first data write sub-circuit and the second data write sub-circuit includes a data write transistor and a compensation transistor, each of the first light-emitting control sub-circuit and the second light-emitting control sub-circuit includes a first light-emitting control transistor and a second light-emitting control transistor, each of the first storage sub-circuit and the second storage sub-circuit includes a storage capacitance, and each of the first drive sub-circuit and the second drive sub-circuit includes a drive transistor, wherein a gate electrode of the third reset transistor is coupled to the reset signal terminal, a first electrode of the third reset transistor is coupled to the third reset power terminal, and a second electrode of the third reset transistor is coupled to the first node;

a gate electrode of the data write transistor is coupled to the first gate signal terminal, a first electrode of the data write transistor is coupled to the data signal terminal, and a second electrode of the data write transistor is coupled to the second node;

a gate electrode of the compensation transistor is coupled to the first gate signal terminal, a first electrode of the compensation transistor is coupled to the third node, and a second electrode of the compensation transistor is coupled to the first node;

one terminal of the storage capacitance is coupled to the second power terminal, and the other terminal of the storage capacitance is coupled to the first node;

a gate electrode of the first light-emitting control transistor is coupled to the light-emitting control terminal, a first electrode of the first light-emitting control transistor is coupled to the second power terminal, and a second electrode of the first light-emitting control transistor is coupled to the second node;

a gate electrode of the second light-emitting control transistor is coupled to the light-emitting control terminal, a first electrode of the second light-emitting control transistor is coupled to the third node, and a second electrode of the second light-emitting control transistor is coupled to the first electrode of the target light-emitting element; and a gate electrode of the drive transistor is coupled to the first node, a first electrode of the drive transistor is coupled to the second node, and a second electrode of the drive transistor is coupled to the third node.

In some embodiments, the third reset transistor, the data write transistor, the compensation transistor, the first light-emitting control transistor, the second light-emitting control transistor, and the drive transistor are P-type transistors;

or the data write transistor, the first light-emitting control transistor, the second light-emitting control transistor, and the drive transistor are P-type transistors, and the third reset transistor and the compensation transistor are N-type transistors.

In some embodiments, a material of the transparent conductive wire includes an indium tin oxide material.

In some embodiments, the second display region is a transparent display region.

In another some embodiments of the present disclosure, a method for driving a pixel circuit is provided. The method is applicable to driving the first pixel circuit and the second pixel circuit in the display panel according to above embodiments, and includes:

in a first phase in which a potential of a first gate drive signal supplied by a first gate signal terminal and a potential of a second gate drive signal supplied by a second gate signal terminal are a first potential, in response to the first gate drive signal, transmitting, by the first pixel circuit, a reset power signal supplied by a first reset power terminal to a first light-emitting element to reset the first light-emitting element;

in a second phase in which the potential of the first gate drive signal and the potential of the second gate drive signal are a second potential, in response to the second gate drive signal, transmitting, by the second pixel circuit, a reset power signal supplied by a second reset power terminal to a second light-emitting element to reset the second light-emitting element;

wherein a potential of the reset power signal transmitted to the first light-emitting element is less than a potential of the reset power signal transmitted to the second light-emitting element.

In some embodiments, prior to the first phase, the method further includes:

in a third phage in which a potential of a reset signal and the potential of the second gate drive signal are the first potential, and a potential of a light-emitting control signal and the potential of the first gate drive signal are the second potential, in response to the reset signal, transmitting, by a reset sub-circuit, a reset power signal supplied by a third reset power terminal to a first node to reset the first node;

upon the second phase, the method further includes:

in a fourth phase in which the potential of the light-emitting control signal and the potential of the second gate drive signal are the first potential, and the potential of the reset signal and the potential of the first gate drive signal are the second potential, in response to the light-emitting control signal, controlling, by a light-emitting control sub-circuit, a second power terminal and a second node to be turned on and a third node and a first electrode of a target light-emitting element to be turned on, and in response to a potential at the first node and a potential at the second node, transmitting, by a drive sub-circuit, a light-emitting drive signal to the third node, wherein the target light-emitting element in the first pixel circuit is the first light-emitting element, and the target light-emitting element in the second pixel circuit is the second light-emitting element; and in the first phase, the potential of the light-emitting control signal and the potential the reset signal are the second potential, and in response to the first gate drive signal, a data write sub-circuit controls a data signal terminal and the second node to be turned on and the third node and the first node to be turned on.

In some embodiments of the present disclosure, a display device is provided. The display device includes: a photosensitive sensor, and the display panel according to above embodiments, wherein the photosensitive sensor is disposed in a second display region of the display panel.

BRIEF DESCRIPTION OF DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

FIG. 13 is a schematic structural diagram of another first pixel and another second pixel according to some embodiments of the present disclosure;

FIG. 14 is a schematic structural diagram of another first pixel and another second pixel according to some embodiments of the present disclosure;

FIG. 15 is a flowchart of a method for driving a pixel circuit according to some embodiments of the present disclosure;

FIG. 16 is a flowchart of another method for driving a pixel circuit according to some embodiments of the present disclosure;

DETAILED DESCRIPTION OF THE INVENTION

Figure 1:
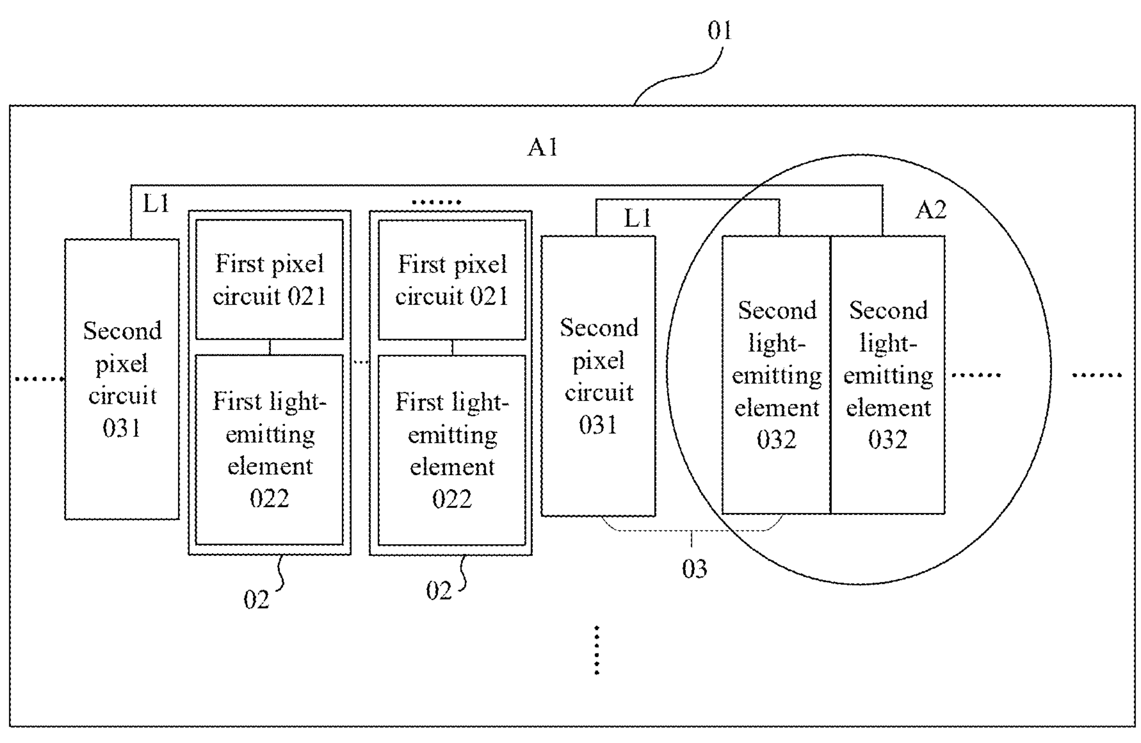
FIG. 1 is a schematic structural diagram of a display panel according to some embodiments of the present disclosure.

To make the objectives, technical solutions, and advantages of the present disclosure clearer, the embodiments of the present disclosure are further described in detail hereinafter with reference to the accompanying drawings.

Transistors in the embodiments of the present disclosure are field effect transistors or other devices with same properties, and the transistors in the embodiments of the present disclosure are mainly switch transistors according to their functions in circuits. As sources and drains of the switch transistors used herein are symmetric, the sources and the drains are exchangeable. In the embodiments of the present disclosure, the source is also referred to as a first electrode, and the drain is also referred to as a second electrode; or the drain is also referred to as a first electrode, and the source is also referred to as a second electrode. Based on structures in the accompanying drawings, a middle terminal is the gate, a signal input terminal is the source, and a signal output terminal is the drain. In addition, the switch transistors in the embodiments of the present disclosure are any one of P-type transistors and N-type transistors. The P-type transistor is turned on in a case that the gate electrode is in a low level, and is turned off in a case that the gate electrode is in a high level. The N-type transistor is turned on in a case that the gate electrode is in a high level, and is turned off in a case that the gate electrode is in a low level. Moreover, signals in the embodiments of the present disclosure have a valid potential and an invalid potential, and the valid potential and the invalid potential only represent that the potential of the signal includes two state, but not represent that the valid potential and the invalid potential have specific values.

With the improvement of the display technologies and increased needs of the users on a screen-to-body ratio, the development of a real full-screen of the display panel of the display device (for example, the mobile phone) is more and more urgent. For design of the real full-screen, a series of display panels including a non-transparent normal display region and a transparent display region emerge, and the normal display region is also referred to as a normal region. In such display panel, some hardware structures are disposed in the transparent display region, such that it is not necessary to punch the screen of the display panel. For example, the hardware structure generally includes a photosensitive sensor or an acoustic sensor (for example, a camera). Taking the hardware structure being the camera as an example, in such display panel, the camera is considered as being hidden below the screen, and the transparent display region is also referred to as a full display with camera (FDC) region. The following embodiments are illustrated by taking the transparent display region being also referred to as the FDC region as an example.

At present, based on the design, the pixels are compressed (for example, reducing a size) using a pixel compressing solution, such that the pixel circuit for driving limit-emitting elements in the FDC region to emit light is disposed in the normal region, and only the limit-emitting element (may be an anode of the limit-emitting element) is disposed in the FDC region. In addition, the pixel circuit in the normal region is connected to the limit-emitting element in the FDC region via a transparent conductive wire. Thus, a purpose that although the pixel circuit for driving limit-emitting elements in the FDC region to emit light is disposed outside the FDC region, the FDC region displays normally, and the light is capable of transmitting the FDC region is achieved, and a luminousness is great. In addition, the pixel circuit in the normal region and the limit-emitting element in the FDC region are directly coupled.

In some practices, a display panel of the display device that hides the hardware structure generally includes a substrate including a first display region and a second display region, a plurality of pixel circuits and a plurality of limit-emitting elements in the first display region, a plurality of limit-emitting elements in the second display region. The hardware structure is hidden in the second display region. Each pixel circuit is coupled to an anode of one limit-emitting element to drive the one limit-emitting element to emit light. In addition, for a great transparent effect of the second display region, the pixel circuit is generally coupled to the limit-emitting element in the second display region via transparent conductive wires. A length of the transparent conductive wire is great as the transparent conductive wire requires to be extended from the first display region to the second display region.

On the basis of a great size of the display panel, a length of the transparent conductive wire for coupling the pixel circuit in the normal region and the limit-emitting element in the FDC region is great, and generally ranges from 0.1 mm to 10 mm. In addition, as each transparent conductive wire passes through some pixel circuits unavoidably, a great parasitic capacitance is present in the transparent conductive wire, and a capacitance of the anode of the limit-emitting element in the FDC region is further increased due to the parasitic capacitance. As it is not necessary to dispose the transparent conductive wire to connect the pixel circuit and the limit-emitting element in the normal region, a capacitance of the anode of the limit-emitting element in the normal region is less. Thus, a difference between the capacitances of the anodes of the limit-emitting elements in the FDC region and the normal region is great. Furthermore, in the display of a same screen in the FDC region and the normal region, a lighting duration of limit-emitting element in the FDC region is longer than a lighting duration of limit-emitting element in the normal region. That is, a lighting speed of limit-emitting element in the FDC region is less than a lighting speed of limit-emitting element in the normal region. That is, the lighting speed of limit-emitting element in the FDC region is less. Thus, a difference in luminance is present between the FDC region and the normal region, which is shown as a purple phenomenon in the FDC region (more obvious in low grayscale), and thus a whole display effect of the display panel is poor. In addition, affected by a luminescent material, a lighting duration of current common green limit-emitting element is most great than limit-emitting elements of other colors (such as red) upon test, and the abnormality is relatively obvious.

On this basis, a novel display panel is provided in the embodiments of the present disclosure. In the display panel, the difference in luminance between the FDC region and the normal region is less, even not present. The display effect of the display panel is great.

FIG. 1 is a schematic structural diagram of a display panel according to some embodiments of the present disclosure. As shown in FIG. 1, the display panel includes:

- a substrate 01. The substrate 01 includes a first display region A1 and a second display region A2. The first display region A1 at least partially surrounds the second display region A2. For example, the second display region A2 shown in FIG. 1 is disposed in a top center of the substrate 01, and is round-shaped. The first display region A1 is rectangular-shaped. In addition, the second display region A2 is surrounded on each side of the rectangular-shaped first display region A1, that is, the second display region A2 is surrounded by the display region A1.

In some embodiments, the second display region A2 is not disposed in the top center of the substrate 01, but other position. For example, in conjunction with FIG. 1, the second display region A2 is disposed in a top left position or a top right position, which is not limited in the embodiments of the present disclosure.

In the embodiments of the present disclosure, the first display region A1 is set as a non-transparent display region, such as the normal region in above embodiments, and the second display region A2 is set as a transparent display region, such as the FDC region in above embodiments. That is, in the embodiments of the present disclosure, the first display region A1 is not transparent, and the second display region A2 is transparent. As such, as described in above embodiments, it is not necessary to punch in the display panel. That is, the hardware structure, such as the camera is directly disposed in the second display region A2, and a solid foundation is set for the realization of true full-screen without affecting the normal display.

It should be noted that an area of the first display region A1 is greatly greater than an area of the second display region A2, and FIG. 1 merely illustratively describes the position relationship, and do not limit the area of display region. Referring to FIG. 1, it can be seen that the display panel in the embodiments of the present disclosure further includes:

A plurality of transparent conductive wires L1. The plurality of transparent conductive wires L1 are disposed in the first display region A1 and the second display region A2.

A plurality of first pixels 02, each first pixel 02 includes a first pixel circuit 021 and a first light-emitting element 022, and the first pixel circuit 021 and the first light-emitting element 022 are disposed in the first display region A1.

A plurality of second pixels 03, the second pixel 03 includes a second pixel circuit 031 and a second light-emitting element 032, and the second pixel circuit 031 and the second light-emitting element 032 are disposed in the second display region A2.

Figure 2:
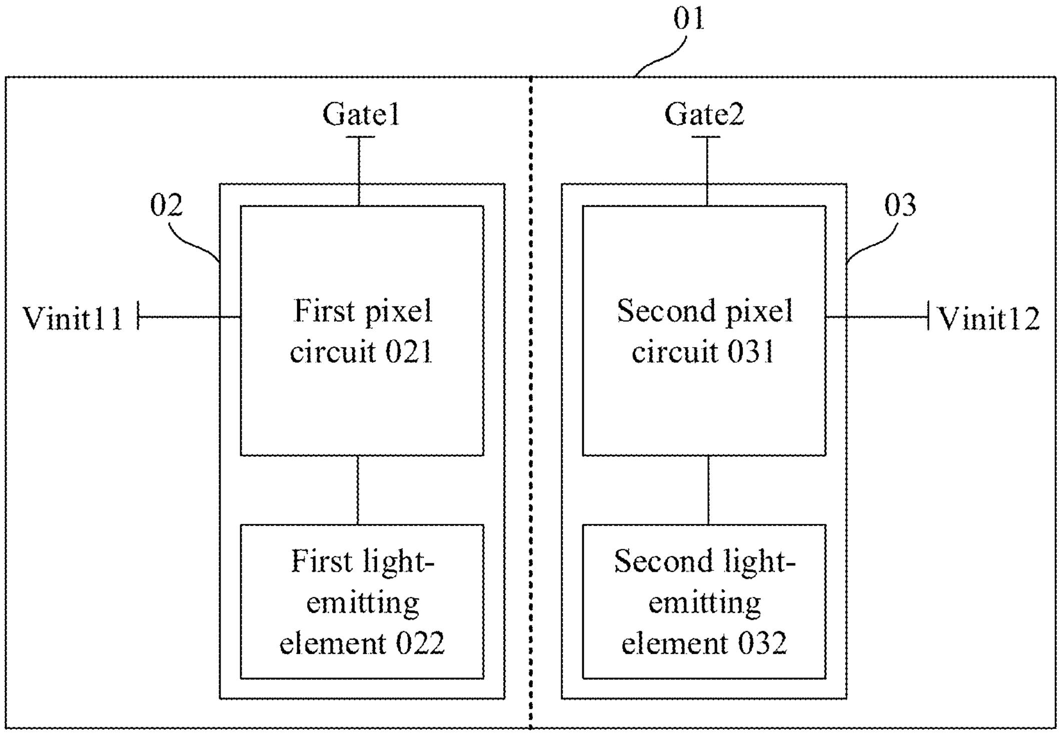
FIG. 2 is a schematic structural diagram of a first pixel and a second pixel according to some embodiments of the present disclosure.

In some embodiments, FIG. 2 is a schematic structural diagram of a first pixel 02 and a second pixel 03 according to some embodiments of the present disclosure. In conjunction with FIG. 1 and FIG. 2, it can be seen that in the first pixel 02, the first pixel circuit 021 is coupled to the first light-emitting element 022 (for example, an anode of the first light-emitting element 022), a first gate signal terminal Gate1, and a first reset power terminal Vinit11, and the first pixel circuit 021 is configured to control, in response to a first gate drive signal supplied by the first gate signal terminal Gate1, the first reset power terminal Vinit11 to transmit a reset power signal to the first light-emitting element 022.

For example, the first pixel circuit 021 is configured to control, in response to the potential of the first gate drive signal supplied by the first gate signal terminal Gate1 being a first potential, the first reset power terminal Vinit11 and the first light-emitting element 022 to be turned on, such that the first reset power terminal Vinit11 transmits the reset power signal to the first light-emitting element 022 to reset the first light-emitting element 022. Then, the first pixel circuit 021 further transmits a light-emitting drive signal to the first light-emitting element 022 to charge a potential of the first light-emitting element 022 from a potential of the reset power signal to a lighting potential, such that the first light-emitting element 022 is lighted (that is, emitting light reliably). The first pixel circuit 021 is configured to control, in response to the potential of the first gate drive signal being a second potential, the first reset power terminal Vinit11 and the first light-emitting element 022 to be turned off.

In the second pixel 03, the second pixel circuit 031 is coupled to the second light-emitting element 032 (for example, an anode of the second light-emitting element 032) via the transparent conductive wire L1, and is further coupled to a second gate signal terminal Gate2 and a second reset power terminal Vinit12. The second pixel circuit 031 is configured to control, in response to a second gate drive signal supplied by the second gate signal terminal Gate2, the second reset power terminal Vinit12 to transmit a reset power signal to the second light-emitting element 032.

For example, the second pixel circuit 031 is configured to control, in response to the potential of the second gate drive signal supplied by the second gate signal terminal Gate2 being a second potential, the second reset power terminal Vinit12 and the second light-emitting element 032 to be turned on, such that the second reset power terminal Vinit12 transmits the reset power signal to the second light-emitting element 032 to reset the second light-emitting element 032. Then, the second pixel circuit 031 further transmits a light-emitting drive signal to the second light-emitting element 032 to charge a potential of the second light-emitting element 032 from a potential of the reset power signal to a lighting potential, such that the second light-emitting element 032 is lighted (that is, emitting light reliably). The second pixel circuit 031 is configured to control, in response to the potential of the second gate drive signal being the first potential, the second reset power terminal Vinit12 and the second light-emitting element 032 to be turned off.

In some embodiments of the present disclosure, the first potential is a low potential, and the second potential is a high potential. That is, the first potential is less than the second potential. In addition, in the embodiments of the present disclosure, a potential of the reset power signal transmitted to the first light-emitting element 022 is less than a potential of the reset power signal transmitted to the second light-emitting element 032. For example, the potential of the reset power signal transmitted to the first light-emitting element 022 is −3 V, and the potential of the reset power signal transmitted to the second light-emitting element 032 is −2.5 V.

In conjunction with above description, a duration of charging the second light-emitting element 032 from the potential of the reset power signal to the lighting potential is shortened. That is, a lighting speed of the second light-emitting element 032 is improved, and a lighting duration of the second light-emitting element 032 is shortened, such that a problem of a less lighting speed caused by a great capacitance of the anode of the second light-emitting element 032 is solved, and the phenomenon of purple second display region A2 is avoided. In addition, as a capacitance of the anode of the first light-emitting element 022 is less than the capacitance of the anode of the second light-emitting element 032, the lighting speed of the second light-emitting element 032 is equal to the lighting speed of the first light-emitting element 022 as possible, such that a luminance of the first light-emitting element 022 and a luminance of the second light-emitting element 032 are the same in a case that the first light-emitting element 022 and the second light-emitting element 032 display a same screen, and thus the display effect of the display panel is improved.

In addition, by disposing the second pixel circuit 031 of the second pixel 03 in the first display region A1, and connecting the second pixel circuit 031 to the second light-emitting element 032 via the transparent conductive wire L1, the transparent effect of the second display region A2 is great, that is, the luminousness is great.

In summary, a display panel is provide in the embodiments of the present disclosure. The display panel includes a substrate including a first display region and a second display region, a first pixel, and a second pixel. The first pixel circuit and the first light-emitting element in the first pixel are disposed in the first display region and are coupled. The second pixel circuit and the second light-emitting element in the second pixel are respectively disposed in the first display region and the second display region, and are coupled via a transparent conductive wire. The first pixel circuit transmits a reset power signal to the first light-emitting element, the second pixel circuit transmits a reset power signal to the second light-emitting element, and a potential of the reset power signal transmitted to the first light-emitting element is less than a potential of the reset power signal transmitted to the second light-emitting element. As such, by flexibly setting the potential of the reset power signal, a problem of the less lighting speed caused by the great capacitance of the anode of the second light-emitting element is solved, such that the lighting speed of the second light-emitting element is equal to the lighting speed of the first light-emitting element as possible, and the display effect of the display panel is ensured to be great.

In some embodiments, in conjunction with FIG. 2, the first reset power terminal Vinit11 coupled to the first pixel circuit 021 and the second reset power terminal Vinit12 coupled to the second pixel circuit 031 are two separated reset power terminals. On this basis, a potential of the reset power signal supplied by the first reset power terminal Vinit11 is less than a potential of the reset power signal supplied by the second reset power terminal Vinit12. In addition, the reset power signal supplied by the first reset power terminal Vinit11 and the reset power signal supplied by the second reset power terminal Vinit12 are direct current signals. The first pixel circuit 021 and the second pixel circuit 031 simultaneously transmit the reset power signal in above embodiments to the coupled light-emitting elements. Or, the first pixel circuit 021 and the second pixel circuit 031 transmit the reset power signal in above embodiments to the coupled light-emitting elements at different time (that is, at different moment).

In some embodiments of the present disclosure, the first reset power terminal Vinit11 coupled to the first pixel circuit 021 and the second reset power terminal Vinit12 coupled to the second pixel circuit 031 are a same reset power terminal (that is, multiplexed). On this basis, the reset power signal supplied by the same reset power terminal are an alternating current signal. The potential of the reset power signal supplied by the same reset power terminal to the first light-emitting element 022 is less than the potential of the reset power signal supplied by the same reset power terminal to the second light-emitting element 032. The first pixel circuit 021 and the second pixel circuit 031 transmit the reset power signal in above embodiments to the coupled light-emitting elements at different time. The following embodiments are illustrated by taking the first reset power terminal Vinit11 and the second reset power terminal Vinit12 being the same reset power terminal as an example.

In some embodiments, in the case that the first pixel circuit 021 and the second pixel circuit 031 transmit the reset power signal in above embodiments to the coupled light-emitting elements at different time, the first pixel circuit 021 transmits the reset power signal to the first light-emitting element 022, and then the second pixel circuit 031 transmits the reset power signal to the second light-emitting element 032; or the second pixel circuit 031 transmits the reset power signal to the second light-emitting element 032, and then first pixel circuit 021 transmits the reset power signal to the first light-emitting element 022, which are not limited in the embodiments of the present disclosure.

In some embodiments, as described in above embodiments, the second display region A2 is a transparent display region. In the case that the camera is disposed in the second display region A2, the second display region A2 is also referred to as the FDC region.

In some embodiments of the present disclosure, a material of the transparent conductive wire L1 includes an indium tin oxide (ITO) material. Correspondingly, the transparent conductive wire L1 is also referred to as the ITO trace. The following embodiments are illustrated by taking the transparent conductive wire L1 being the ITO trace as an example. In some embodiments, the material of the transparent conductive wire L1 includes other transparent material, for example, indium gallium zinc oxide (IGZO), which is not limited in the embodiments of the present disclosure.

In some embodiments, in the plurality of transparent conductive wires L1 in the embodiments of the present disclosure, at least two transparent conductive wires L1 are disposed in different layers, and at least two transparent conductive wires L1 are disposed in a same layer. That is, at least a part of transparent conductive wires L1 are disposed in a same layer, and at least another part of transparent conductive wires L1 are disposed in different layers.

In some embodiments, the plurality of transparent conductive wires L1 include at least one first transparent conductive wire ITO1, at least one second transparent conductive wire ITO2, and at least one third transparent conductive wire ITO3. The first transparent conductive wire ITO1, the second transparent conductive wire ITO2, and the third transparent conductive wire ITO3 are disposed in different layers. Each of the plurality of first pixels 02 and the plurality of second pixels 03 includes a red pixel, a green pixel, and a blue pixel. In the red pixels in the plurality of second pixels 03, the second pixel circuit 031 is coupled to the anode of the second light-emitting element 032 via the first transparent conductive wire ITO1. In the green pixels in the plurality of second pixels 03, the second pixel circuit 031 is coupled to the anode of the second light-emitting element 032 via the second transparent conductive wire ITO2. In the blue pixels in the plurality of second pixels 03, the second pixel circuit 031 is coupled to the anode of the second light-emitting element 032 via the third transparent conductive wire ITO3.

the term "in the same layer" means a layer structure acquired by forming a film layer for forming a specific pattern by a film forming process and patterning the film layer by a one patterning process using a same mask plate. Based on different specific patterns, the one patterning process includes several exposing, developing, and etching processes, and the specific pattern in the formed layer structure is contiguous or dis-contiguous. That is, elements, assemblies, structures, and/or portions in the "same layer" are formed by a same material and by the same patterning process. As such, the processes and cost for manufacturing are saved, and the efficient of manufacturing is fastened. In the embodiments of the present disclosure, the transparent conductive wires L1 in the same layer are the transparent conductive wires once formed by the same material in the same layer.

Figure 3:
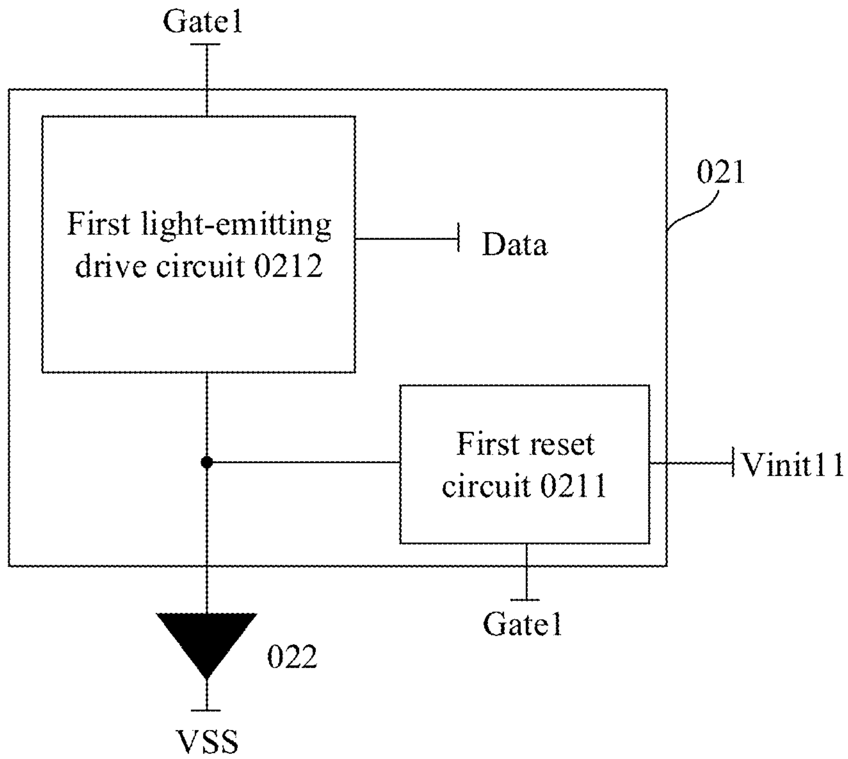
FIG. 3 is a schematic structural diagram of another first pixel according to some embodiments of the present disclosure.

FIG. 3 is a schematic structural diagram of another first pixel according to some embodiments of the present disclosure. As shown in FIG. 3, the first pixel circuit 021 includes a first reset circuit 0211 and a first light-emitting drive circuit 0212.

The first reset circuit 0211 is coupled to the first gate signal terminal Gate1, the first reset power terminal Vinit11, and a first electrode of the first light-emitting element 022, and is configured to control, in response to the first gate drive signal, the first reset power terminal Vinit11 to transmit the reset power signal to the first electrode of the first light-emitting element 022. That is, the first reset circuit 0211 in the first pixel circuit 021 controls, in response to the first gate drive signal, the first reset power terminal Vinit11 to transmit the reset power signal to the first electrode of the first light-emitting element 022, so as to reset the first electrode of the first light-emitting element 022.

The first light-emitting drive circuit 0212 is coupled to the first gate signal terminal Gate1, a data signal terminal Date, and the first electrode of the first light-emitting element 022, and is configured to transmit, in response to the first gate drive signal and a data signal supplied by the data signal terminal Date, a light-emitting drive signal to the first electrode of the first light-emitting element 022 to drive the first light-emitting element 022 to emit light. That is, the first light-emitting drive circuit 0212 in the first pixel circuit 021 transmits the light-emitting drive signal to the first light-emitting element 022 to charge a potential of the first electrode of the first light-emitting element 022 to a lighting potential, so as to drive the first light-emitting element 022 to emit light.

A second electrode of the first light-emitting element 022 is coupled to a first power terminal VSS, and the first light-emitting element 022 emits the light under the action of the different in potential of the first power signal supplied by the first power terminal VSS and the received light-emitting drive signal. In addition, in conjunction with above embodiments, the first electrode of the first light-emitting element 022 is the anode, and the second electrode of the first light-emitting element 022 is the cathode accordingly. In some embodiments, the first electrode is the cathode, and the second electrode is the anode accordingly.

Figure 4:
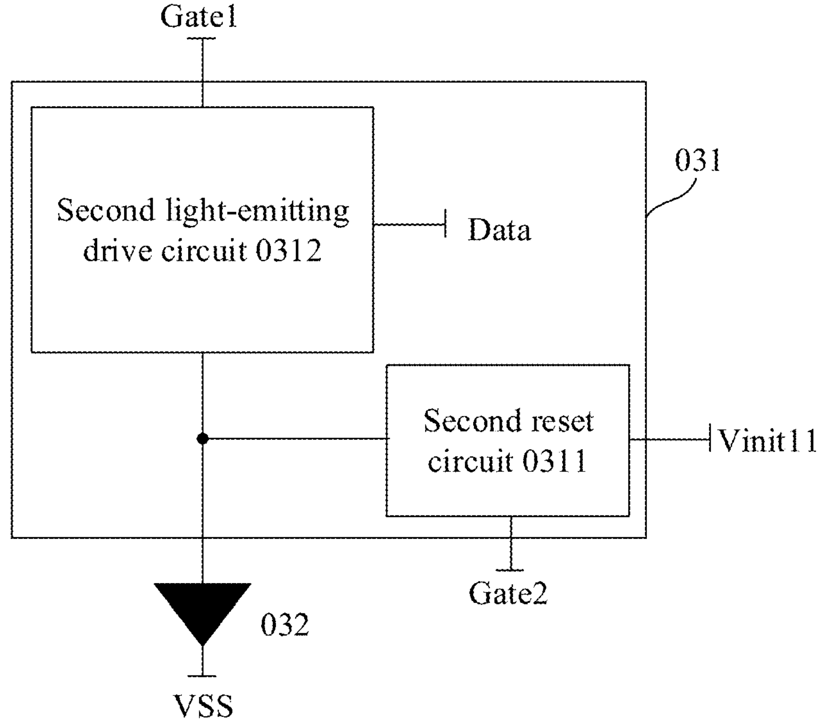
FIG. 4 is a schematic structural diagram of another second pixel according to some embodiments of the present disclosure.

FIG. 4 is a schematic structural diagram of another second pixel according to some embodiments of the present disclosure. As shown in FIG. 4, the second pixel circuit 031 includes a second reset circuit 0311 and a second light-emitting drive circuit 0312.

The second reset circuit 0311 is coupled to the second gate signal terminal Gate2, the second reset power terminal Vinit12, and a first electrode of the second light-emitting element 032, and is configured to control, in response to the second gate drive signal, the second reset power terminal Vinit12 to transmit the reset power signal to the first electrode of the second light-emitting element 032. That is, the second reset circuit 0311 in the second pixel circuit 031 controls, in response to the second gate drive signal, the second reset power terminal Vinit12 to transmit the reset power signal to the first electrode of the second light-emitting element 032, so as to reset the first electrode of the second light-emitting element 032. In FIG. 4, the second reset power terminal Vinit12 and the first reset power terminal Vinit11 are multiplexed, are all are denoted as Vinit11.

The second light-emitting drive circuit 0312 is coupled to the first gate signal terminal Gate1, the data signal terminal Date, and the first electrode of the second light-emitting element 032, and is configured to transmit, in response to the first gate drive signal and the data signal, a light-emitting drive signal to the first electrode of the second light-emitting element 032 to drive the second light-emitting element 032 to emit light. That is, the second light-emitting drive circuit 0312 in the second pixel circuit 031 transmits the light-emitting drive signal to the second light-emitting element 032 to charge a potential of the first electrode of the second light-emitting element 032 to a lighting potential, so as to drive the second light-emitting element 032 to emit light.

A second electrode of the second light-emitting element 032 is coupled to the first power terminal VSS, and the second light-emitting element 032 emits the light under the action of the different in potential of the first power signal supplied by the first power terminal VSS and the received light-emitting drive signal. In addition, in conjunction with above embodiments, the first electrode of the second light-emitting element 032 is the anode, and the second electrode of the second light-emitting element 032 is the cathode accordingly. In some embodiments, the first electrode is the cathode, and the second electrode is the anode accordingly.

Figure 5:
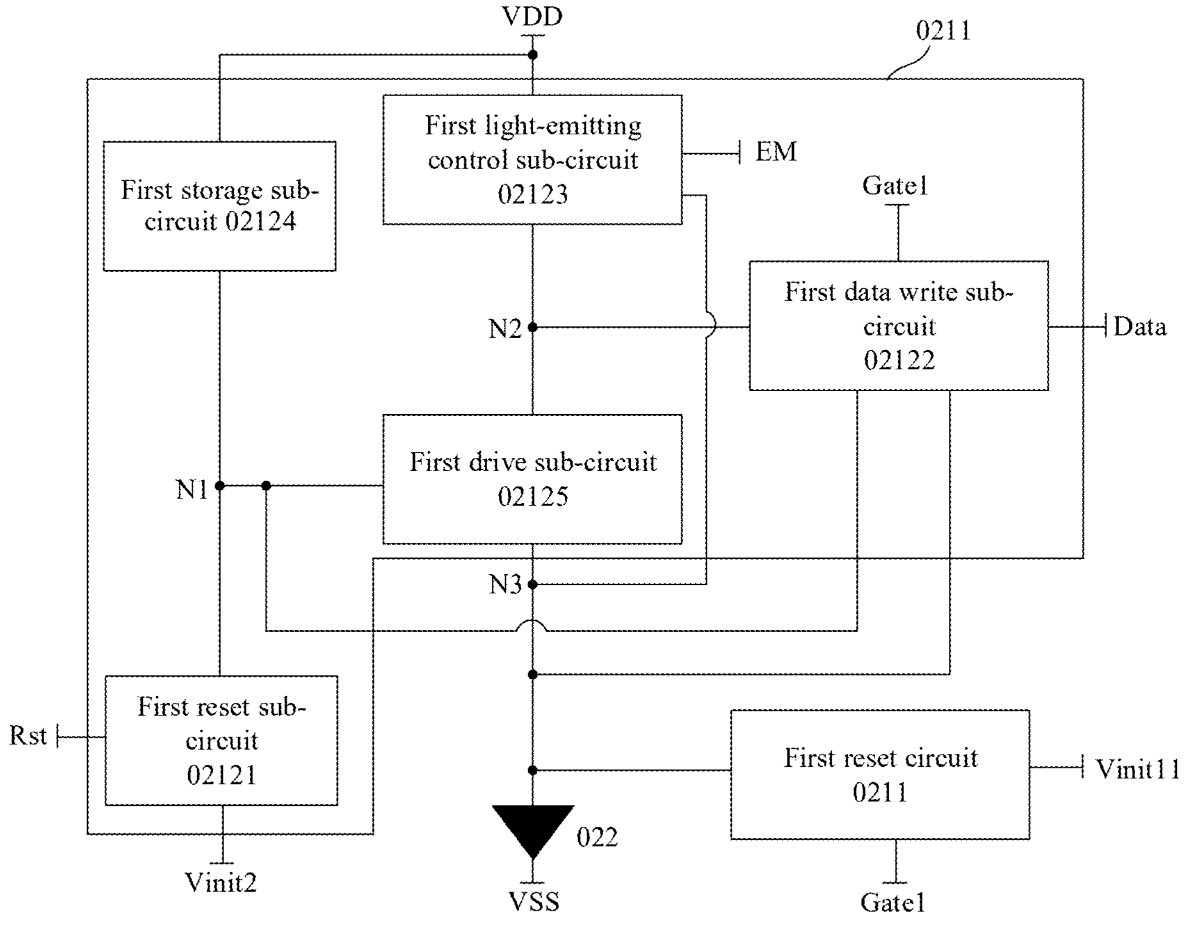
FIG. 5 is a schematic structural diagram of another first pixel according to some embodiments of the present disclosure.
Figure 6:
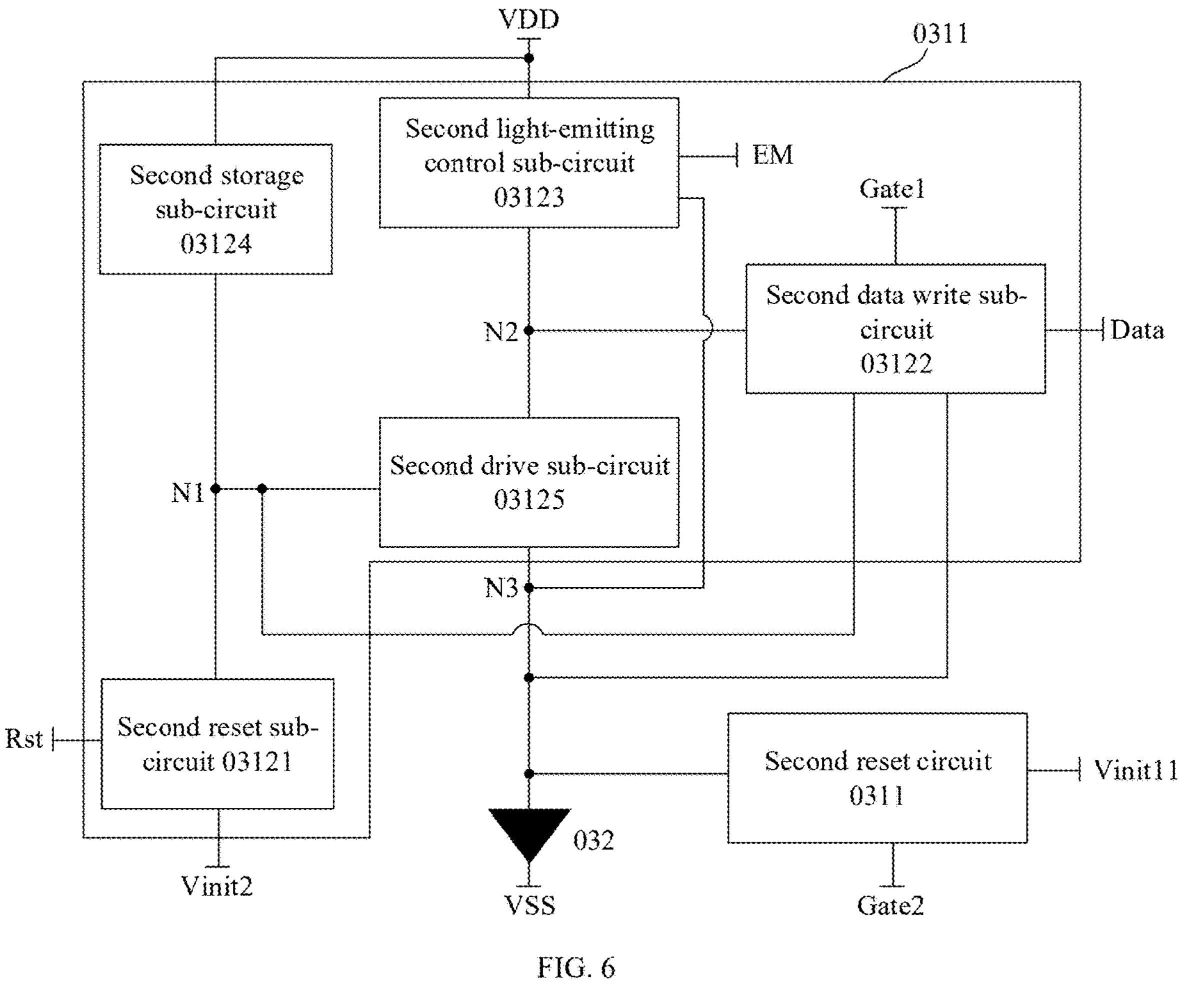
FIG. 6 is a schematic structural diagram of another second pixel according to some embodiments of the present disclosure.

FIG. 5 is a schematic structural diagram of another first pixel according to some embodiments of the present disclosure. As shown in FIG. 5, the first light-emitting drive circuit 0212 includes a first reset sub-circuit 02121, a first data write sub-circuit 02122, a first light-emitting control sub-circuit 02123, a first storage sub-circuit 02124, and a first drive sub-circuit 02125. FIG. 6 is a schematic structural diagram of another second pixel according to some embodiments of the present disclosure. As shown in FIG. 6, the second light-emitting drive circuit 0312 includes a second reset sub-circuit 03121, a second data write sub-circuit 03122, a second light-emitting control sub-circuit 03123, a second storage sub-circuit 03124, and a second drive sub-circuit 03125.

Each of the first reset sub-circuit 02121 and the second reset sub-circuit 03121 is coupled to a reset signal terminal Rst, a third reset power terminal Vinit2, and a first node N1, and is configured to control, in response to a reset signal supplied by the reset signal terminal Rst, the third reset power terminal Vinit2 and the first node N1 to be turned on or turned off.

For example, taking the first reset sub-circuit 02121 as an example, the first reset sub-circuit 02121 controls, in response to a potential of the reset signal supplied by the reset signal terminal Rst being the first potential, the third reset power terminal Vinit2 and the first node N1 to be turned on. In this case, a reset power signal supplied by the third reset power terminal Vinit2 is transmitted to the first node N1 to reset the first node N1. The first reset sub-circuit 02121 controls, in response to a potential of the reset signal supplied by the reset signal terminal Rst being the second potential, the third reset power terminal Vinit2 and the first node N1 to be turned off. The second reset sub-circuit 03121 is in the same manner, which is not repeated herein.

In some embodiments of the present disclosure, a potential of the reset power signal transmitted to the first node N1 is less than a potential of the reset power signal transmitted to the light-emitting element (including the first light-emitting element 022 and the second light-emitting element 032). For example, the potential of the reset power signal supplied by the third reset power terminal Vinit2 is −3.5 V, such that the first node N1 is reset reliably.

Each of the first data write sub-circuit 02122 and the second data write sub-circuit 03122 is coupled to the first gate signal terminal Gate1, a data signal terminal Date, the first node N1, a second node N2, and a third node N3, and is configured to control, in response to the first gate drive signal, the data signal terminal Date and the second node N2 to be turned on or turned off and the third node N3 and the first node N1 to be turned on or turned off.

For example, taking the first data write sub-circuit 02122 as an example, the first data write sub-circuit 02122 controls, in response to a potential of the first gate drive signal being the first potential, the data signal terminal Date and the second node N2 to be turned on and the third node N3 and the first node N1 to be turned on. In this case, the data signal supplied by the data signal terminal Date is transmitted to the second node N2, and a potential at the third node N3 and a potential at the third node N1 are affected by each other. The first data write sub-circuit 02122 controls, in response to the potential of the first gate drive signal being the second potential, the data signal terminal Date and the second node N2 to be turned off and the third node N3 and the first node N1 to be turned off. The second data write sub-circuit 03122 is in the same manner, which is not repeated herein.

Each of the first light-emitting control sub-circuit 02123 and the second light-emitting control sub-circuit 03123 is coupled to a light-emitting control terminal EM, a second power terminal VDD, the second node N2, the third node N3, and a first electrode of a target light-emitting element, and is configured to control, in response to a light-emitting control signal supplied by the light-emitting control terminal EM, the second power terminal VDD and the second node N2 to be turned on or turned off and the third node N3 and the first electrode of the target light-emitting element to be turned on or turned off, and a second electrode of the target light-emitting element is coupled to the second power terminal VDD.

The target light-emitting element in the first pixel circuit 021 is the first light-emitting element 022, and the target light-emitting element in the second pixel circuit 031 is the second light-emitting element 032.

For example, taking the first light-emitting control sub-circuit 02123 as an example, the first light-emitting control sub-circuit 02123 controls, in response to a potential of the light-emitting control signal supplied by the light-emitting control terminal EM being the first potential, the second power terminal VDD and the second node N2 to be turned on and the third node N3 and the first electrode of the first light-emitting element 022 to be turned on. In this case, a second power signal supplied by the second power terminal VDD is transmitted to the second node N2, and a potential at the third node N3 is transmitted to the first electrode of the first light-emitting element 022. That is, the second power terminal VDD and the first power terminal VSS form a loop, such that the first light-emitting element 022 emits the light. The second light-emitting control sub-circuit 03123 is in the same manner, which is not repeated herein.

Each of the first storage sub-circuit 02124 and the second storage sub-circuit 03124 is coupled to the second power terminal VDD and the first node N1, and is configured to store, in response to a second power signal supplied by the second power terminal VDD, a potential at the first node N1.

Each of the first drive sub-circuit 02125 and the second drive sub-circuit 03125 is coupled to the first node N1, the second node N2, and the third node N3, and is configured to transmit, in response to the potential at the first node N1 and a potential at the second node N2, a light-emitting drive signal to the third node N3.

Taking the first drive sub-circuit 02125 as an example, in the case that the first light-emitting control sub-circuit 02123 controls the third node N3 and the first electrode of the first light-emitting element 022 to be turned on, the light-emitting drive signal transmitted to the third node N3 is further transmitted to the first electrode of the first light-emitting element 022 through the first light-emitting control sub-circuit 02123. Furthermore, the first light-emitting element 022 emits the light under the action of the difference in potential of the light-emitting drive signal and the second power signal supplied by the first power terminal coupled to the second electrode of the first light-emitting element 022.

In addition, as the light-emitting drive signal is transmitted to the first electrode of the first light-emitting element 022 through the first light-emitting control sub-circuit 02123, the light-emitting drive signal transmitted to the third node N3 and the light-emitting drive signal transmitted to the first electrode of the first light-emitting element 022 are different (such as, the potentials are different). The second drive sub-circuit 03125 is in the same manner, which is not repeated herein.

Figure 7:
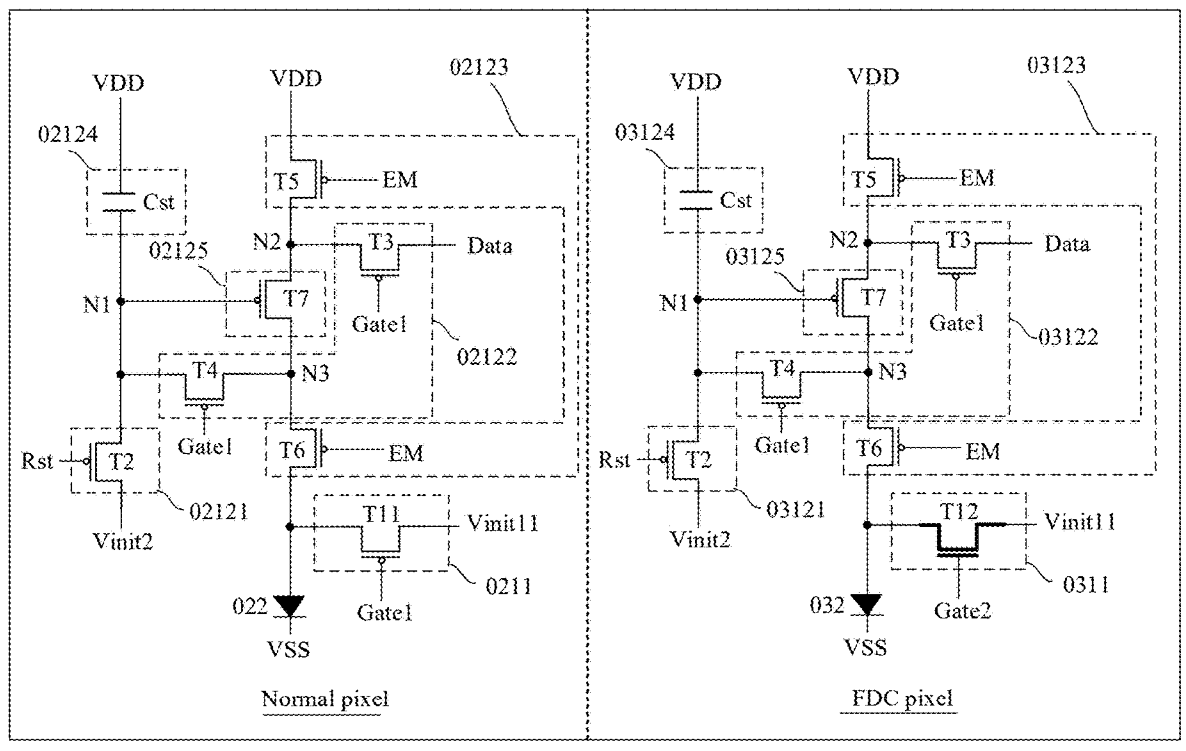
FIG. 7 is a schematic structural diagram of another first pixel and another second pixel according to some embodiments of the present disclosure.

FIG. 7 is a schematic structural diagram of another first pixel (that is, the normal pixel) and another second pixel (that is, the FDC pixel) according to some embodiments of the present disclosure. As shown in FIG. 7, the first reset circuit 0211 includes a first reset transistor T11, and the second reset circuit 0322 includes a second reset transistor T12.

A gate electrode of the first reset transistor T11 is coupled to the first gate signal terminal Gate1, a first electrode of the first reset transistor T11 is coupled to the first reset power terminal Vinit11, and a second electrode of the first reset transistor T11 is coupled to the first electrode of the first light-emitting element 022.

A gate electrode of the second reset transistor T12 is coupled to the second gate signal terminal Gate2, a first electrode of the second reset transistor T12 is coupled to the second reset power terminal Vinit12, and a second electrode of the second reset transistor T12 is coupled to the first electrode of the second light-emitting element 032. In FIG. 7, the second reset power terminal Vinit12 and the first reset power terminal Vinit11 are multiplexed, are all are denoted as Vinit11.

In addition, the first reset transistor T11 and the second reset transistor T12 are of different types. For example, referring to FIG. 7, the first reset transistor T11 is a P-type transistor, and the second reset transistor T12 is an N-type transistor. On this basis, it can be further seen that in the embodiments of the present disclosure, the first potential is a low potential relative to the second potential, a valid potential of the first gate drive signal is different from a valid potential of the second gate drive signal, and the first reset transistor T11 and the second reset transistor T12 are respectively controlled to respectively reset the first light-emitting element 022 and the second light-emitting element 032, such that different reset power signals are transmitted to the first light-emitting element 022 and the second light-emitting element 032.

In some embodiments of the present disclosure, the P-type transistor and the N-type transistor are metal-oxide-semiconductor (MOS) transistors. That is, the first reset transistor T11 is a PMOS transistor, and the second reset transistor T12 is a NMOS transistor.

Figure 8:
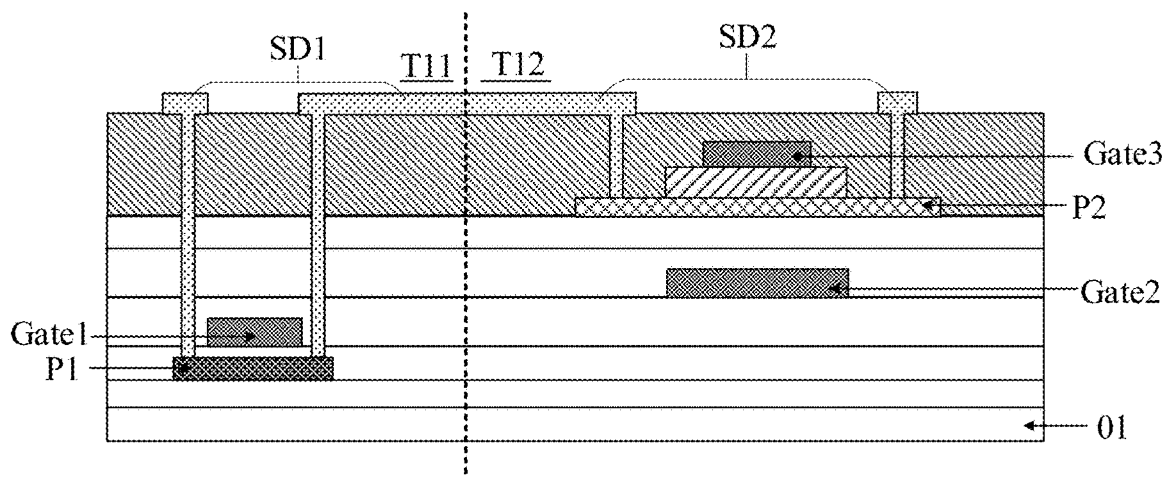
FIG. 8 is a schematic diagram of film layers of a first reset transistor and a second reset transistor according to some embodiments of the present disclosure.

On this basis, it can be seen referring to the film layer structure in FIG. 8 that the first reset transistor T11 includes a first active (poly-) layer P1, a first gate metal layer GATE1, and a first source-drain metal layer SD1 that are laminated in a direction away from the substrate 01. The first active layer P1 is coupled to the first source-drain metal layer SD1. For example, the first source-drain metal layer SD1 is in lap joint with the first active layer P1 through a via hole, and the via hole penetrates through the film layers between the first active layer P1 and the first source-drain metal layer SD1.

The second reset transistor T12 includes a second gate metal layer GATE2, a second active layer P2, a third gate metal layer GATE3, and a second source-drain metal layer SD2 that are laminated in the direction away from the substrate 01. The second source-drain metal layer SD2 is coupled to the second active layer P2. Likewise, the second source-drain metal layer SD2 is in lap joint with the second active layer P2 through a via hole, and the via hole penetrates through the film layers between the second active layer P2 and the second source-drain metal layer SD2.

In addition, the first source-drain metal layer SD1 and the second source-drain metal layer SD2 are disposed in a same layer, and the second gate metal layer GATE2 is farther away from the substrate 01 than the first gate metal layer GATE1. In addition, it can be seen in conjunction with FIG. 8 that one or more insulation layers are disposed between each two adjacent conductive layers in the direction away from the substrate 01. The insulation layer is configured to insulate the two adjacent conductive layers to avoid signal interference.

In some embodiments a material of the first active layer P1 includes a low temperature poly-silicon (LTPS) material, and a material of the second active layer P2 includes an oxide material, for example, the IGZO material. That is, the P-type transistor in the embodiments of the present disclosure is a LTPS transistor, and the N-type transistor in the embodiments of the present disclosure is an oxide transistor. On this basis, the pixel circuit in the embodiments of the present disclosure is a low temperature polycrystalline oxide (LTPO) pixel circuit.

Figures 9, 10:
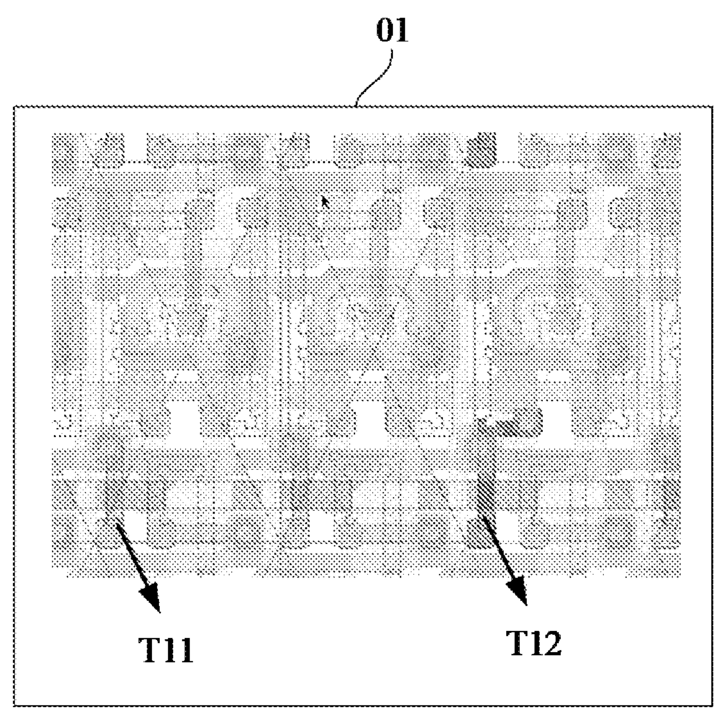
FIG. 9 is a structural layout of film layers of a first pixel and a second pixel according to some embodiments of the present disclosure.
FIG. 10 is a structural layout of film layers of an active layer in a first pixel and a second pixel according to some embodiments of the present disclosure.
Figure 11:
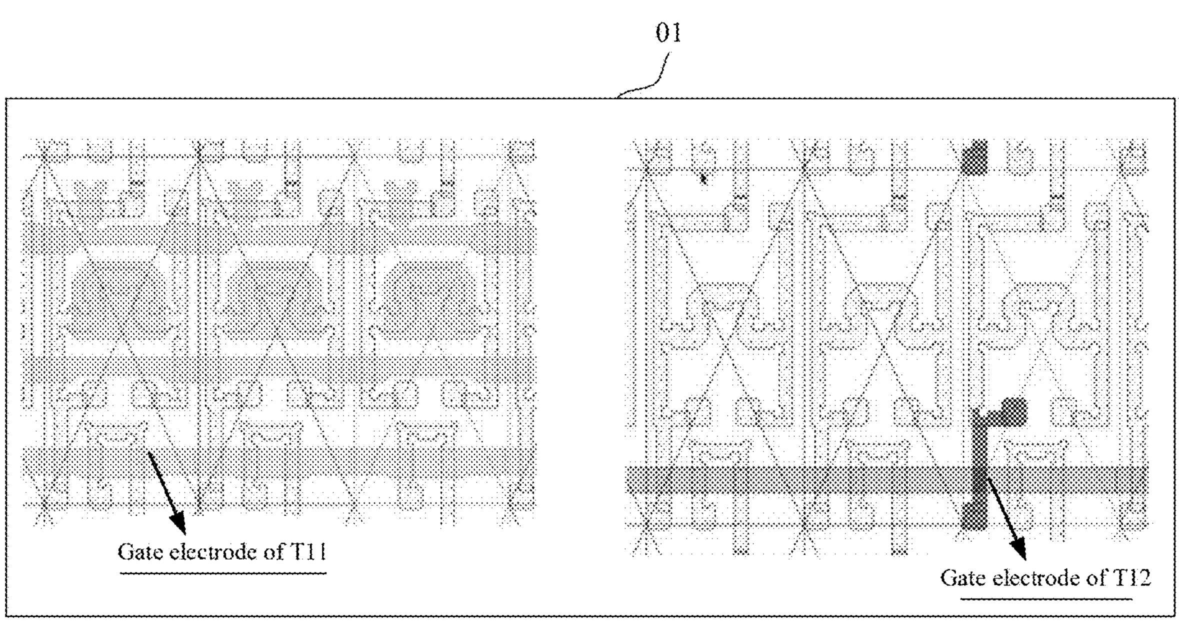
FIG. 11 is a structural layout of film layers of an active layer and a gate metal layer in a first pixel and a second pixel according to some embodiments of the present disclosure.

In some embodiments, FIG. 9 is a structural layout of film layers of a part of the display panel. The first reset transistor T11 and the second reset transistor T12 are marked. Based on the structure shown in FIG. 9, FIG. 10 is a structural layout of film layers of an active layer P1, and FIG. 11 is a structural layout of film layers of an active layer P1 and a gate metal layer (that is, a gate electrode).

It can be seen referring to FIG. 7 that each of the first reset sub-circuit 02121 and the second reset sub-circuit 03121 includes a third reset transistor T2, each of the first data write sub-circuit 02122 and the second data write sub-circuit 03122 includes a data write transistor T3 and a compensation transistor T4, each of the first light-emitting control sub-circuit 02123 and the second light-emitting control sub-circuit 03123 includes a first light-emitting control transistor T5 and a second light-emitting control transistor T6, each of the first storage sub-circuit 02124 and the second storage sub-circuit 03124 includes a storage capacitance Cst, and each of the first drive sub-circuit 02125 and the second drive sub-circuit 03125 includes a drive transistor T7.

A gate electrode of the third reset transistor T2 is coupled to the reset signal terminal Rst, a first electrode of the third reset transistor T2 is coupled to the third reset power terminal Vinit2, and a second electrode of the third reset transistor T2 is coupled to the first node N1.

A gate electrode of the data write transistor T3 is coupled to the first gate signal terminal Gate1, a first electrode of the data write transistor T3 is coupled to the data signal terminal Data, and a second electrode of the data write transistor T3 is coupled to the second node N2.

A gate electrode of the compensation transistor T4 is coupled to the first gate signal terminal Gate1, a first electrode of the compensation transistor T4 is coupled to the third node N3, and a second electrode of the compensation transistor T4 is coupled to the first node N1.

One terminal of the storage capacitance Cst is coupled to the second power terminal VDD, and the other terminal of the storage capacitance Cst is coupled to the first node N1.

A gate electrode of the first light-emitting control transistor T5 is coupled to the light-emitting control terminal EM, a first electrode of the first light-emitting control transistor T5 is coupled to the second power terminal VDD, and a second electrode of the first light-emitting control transistor T5 is coupled to the second node N2.

A gate electrode of the second light-emitting control transistor T6 is coupled to the light-emitting control terminal EM, a first electrode of the second light-emitting control transistor T6 is coupled to the third node N3, and a second electrode of the second light-emitting control transistor T6 is coupled to the first electrode of the target light-emitting element. For example, in the first pixel circuit 021, the second electrode of the first light-emitting control transistor T5 is coupled to the anode of the first light-emitting element 022. In the second pixel circuit 031, the second electrode of the first light-emitting control transistor T5 is coupled to the anode of the second light-emitting element 032.

A gate electrode of the drive transistor T7 is coupled to the first node N1, a first electrode of the drive transistor T7 is coupled to the second node N2, and a second electrode of the drive transistor T7 is coupled to the third node N3.

In some embodiments, as shown in FIG. 7, in the first pixel circuit 021 and the second pixel circuit 031, the third reset transistor T2, the data write transistor T3, the compensation transistor T4, the first light-emitting control transistor T5, the second light-emitting control transistor T6, and the drive transistor T7 are P-type transistors.

Figure 12:
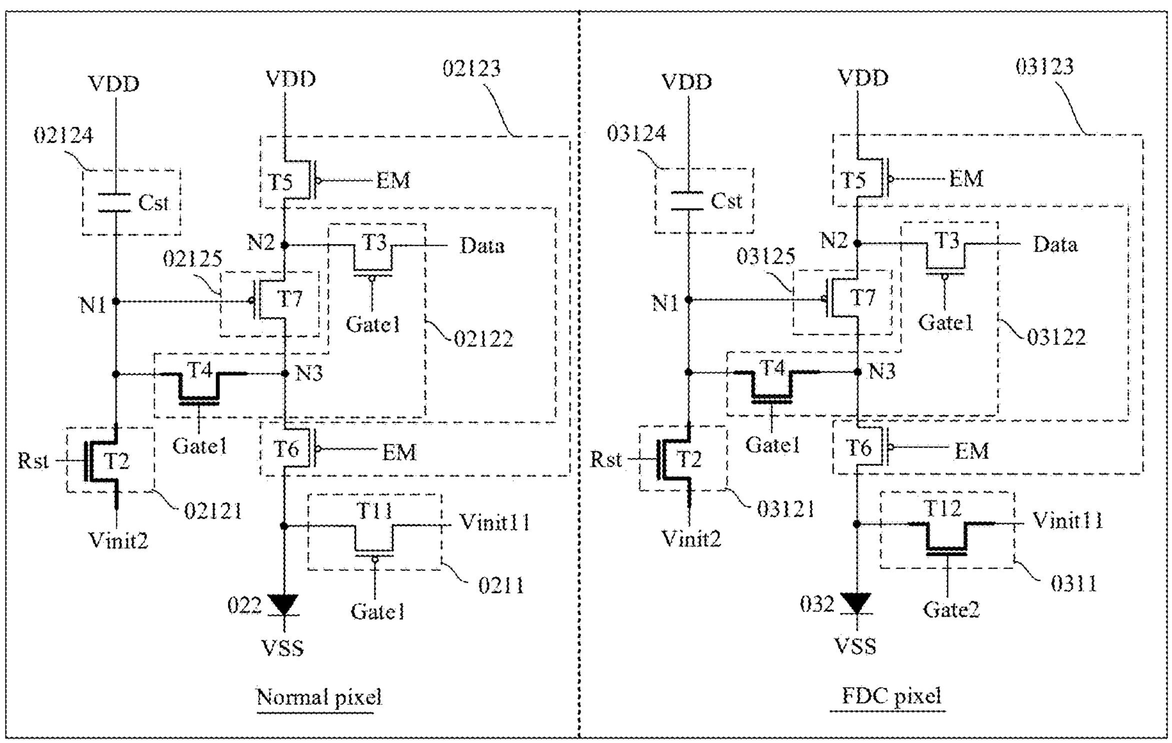
FIG. 12 is a schematic structural diagram of another first pixel and another second pixel according to some embodiments of the present disclosure.

Or, as shown in FIG. 12, in the first pixel circuit 021 and the second pixel circuit 031, the data write transistor T3, the first light-emitting control transistor T5, the second light-emitting control transistor T6, and the drive transistor T7 are P-type transistors, and the third reset transistor T2 and the compensation transistor T4 are N-type transistors. As described in above embodiments, all P-type transistors shown in FIG. 7 and FIG. 12 are LTPS transistors, all N-type transistors shown in FIG. 7 and FIG. 12 are oxide transistors. That is, the first pixel circuit 021 and the second pixel circuit 031 in the embodiments of the present disclosure are LTPO pixel circuit.

It should be noted that the first pixel circuit 021 and the second pixel circuit 031 in the embodiments of the present disclosure shown in FIG. 7 and FIG. 12 are pixel circuits of 7T1C structures. In some embodiments, the first pixel circuit 021 and/or the second pixel circuit 031 are pixel circuits of other structure (for example, 6T1C), which is not limited in the embodiments of the present disclosure.

In some embodiments of the present disclosure, the plurality of first pixels 02 and the plurality of second pixels 03 are arranged in a row and column array. The pixels are compressed in a compression solution of "N compressing 1". The "N compressing 1" refers to that in the plurality of first pixels 02, each N columns first pixels 02 are adjacent, and one column of second pixel circuit 031 in the second pixel are disposed between each adjacent N columns first pixels 02 and N columns first pixels 02. For example, assuming that N is equal to 3, each three columns first pixels 02 are adjacent, and one column of second pixel circuit 031 are disposed between each adjacent three columns first pixels 02 and each adjacent three columns first pixels 02.

In some embodiments, in the case that N is equal to 3, that is, the pixels are compressed in a compression solution of "3 compressing 1," FIG. 13 shows a schematic structural diagram of another first pixel 02 and another second pixel 03 by taking the structure shown in FIG. 7 as an example, FIG. 14 shows a schematic structural diagram of another first pixel 02 and another second pixel 03 by taking the structure shown in FIG. 12 as an example. In conjunction with FIG. 13 and FIG. 14, it can be seen that the pixels in the first column to the third column are the first pixels 02 (that is, the normal pixel), the pixels in the fourth column are the second pixels 03 (that is, the FDC pixel), and so on. The first pixel 02 and the second pixel 03 differ in that the first reset transistor T11 in the first pixel 02 is the PMOS pixel, the gate is coupled to the first gate signal terminal Gate1, the second reset transistor T12 in the second pixel 03 is the NMOS pixel, and the gate is coupled to the second gate signal terminal Gate2. Thus, in conjunction with the above embodiments, the first reset transistor T11 and the second reset transistor T12 are controlled in different time, and the display effect of the display panel is improved by adjusting the potential of the reset power signal transmitted to the first limit-emitting element 022 and the potential of the reset power signal transmitted to the second limit-emitting element 032.

In summary, a display panel is provide in the embodiments of the present disclosure. The display panel includes a substrate including a first display region and a second display region, a first pixel, and a second pixel. The first pixel circuit and the first light-emitting element in the first pixel are disposed in the first display region and are coupled. The second pixel circuit and the second light-emitting element in the second pixel are respectively disposed in the first display region and the second display region, and are coupled via a transparent conductive wire. The first pixel circuit transmits a reset power signal to the first light-emitting element, the second pixel circuit transmits a reset power signal to the second light-emitting element, and a potential of the reset power signal transmitted to the first light-emitting element is less than a potential of the reset power signal transmitted to the second light-emitting element. As such, by flexibly setting the potential of the reset power signal, a problem of the less lighting speed caused by the great capacitance of the anode of the second light-emitting element is solved, such that the lighting speed of the second light-emitting element is equal to the lighting speed of the first light-emitting element as possible, and the display effect of the display panel is ensured to be great.

FIG. 15 is a flowchart of a method for driving a pixel circuit according to some embodiments of the present disclosure. The method is applicable to driving the first pixel circuit 021 and the second pixel circuit 031 that are disposed in the same row in the display panel shown in any accompanying drawing. As shown in FIG. 15, the method includes the follows.

In S1501, in a first phase in which a potential of a first gate drive signal supplied by a first gate signal terminal and a potential of a second gate drive signal supplied by a second gate signal terminal are a first potential, the first pixel circuit transmits, in response to the first gate drive signal, a reset power signal supplied by a first reset power terminal to a first light-emitting element to reset the first light-emitting element.

In S1502, in a second phase in which the potential of the first gate drive signal and the potential of the second gate drive signal are a second potential, the second pixel circuit transmits, in response to the second gate drive signal, a reset power signal supplied by a second reset power terminal to a second light-emitting element to reset the second light-emitting element.

A potential of the reset power signal transmitted to the first light-emitting element is less than a potential of the reset power signal transmitted to the second light-emitting element.

In some embodiments, referring to a flowchart of another method for driving a pixel circuit shown in FIG. 16, prior to the first phase (that is, S1501), the method further includes the follows.

In S1503, in a third phage in which a potential of a reset signal and the potential of the second gate drive signal are the first potential, and a potential of a light-emitting control signal and the potential of the first gate drive signal are the second potential, a reset sub-circuit transmits, in response to the reset signal, a reset power signal supplied by a third reset power terminal to a first node to reset the first node.

Upon the second phase (that is, S1503), the method further includes the follows.

In S1504, in a fourth phase in which the potential of the light-emitting control signal and the potential of the second gate drive signal are the first potential, and the potential of the reset signal and the potential of the first gate drive signal are the second potential, a light-emitting control sub-circuit controls, in response to the light-emitting control signal, a second power terminal and a second node to be turned on and a third node and a first electrode of a target light-emitting element to be turned on, and a drive sub-circuit transmits, in response to a potential at the first node and a potential at the second node, a light-emitting drive signal to the third node.

The target light-emitting element in the first pixel circuit is the first light-emitting element, and the target light-emitting element in the second pixel circuit is the second light-emitting element.

In the first phase (that is, S1501) in which the potential of the light-emitting control signal and the potential the reset signal are the second potential, a data write sub-circuit controls, in response to the first gate drive signal, a data signal terminal and the second node to be turned on and the third node and the first node to be turned on.

In addition, it should be noted that in conjunction with FIG. 7 and FIG. 12, in the first phase, the first reset circuit in the first pixel circuit transmits, in response to the first gate drive signal, the reset power signal supplied by the first reset power terminal to the first light-emitting element to reset the first light-emitting element, and in the second phase, the second reset circuit in the second pixel circuit transmits, in response to the second gate drive signal, the reset power signal supplied by the second reset power terminal to the second light-emitting element to reset the second light-emitting element.

Figures 17, 18:
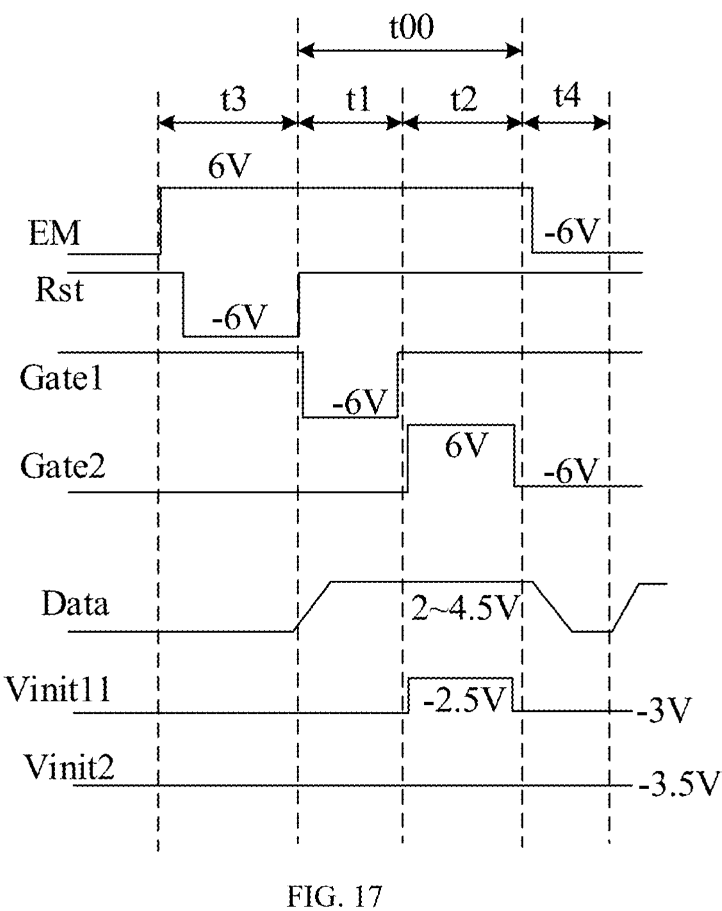
FIG. 17 is a timing diagram of a signal terminal coupled to a pixel circuit according to some embodiments of the present disclosure.
FIG. 18 is an equivalent circuit diagram of a first pixel and a second pixel in a third phase according to some embodiments of the present disclosure.

Based on the structure of the pixel circuit shown in FIG. 7, taking the first potential being a low potential, the second potential being a high potential, and the first reset power terminal Vinit11 and the second reset power terminal Vinit12 being multiplexed as the first reset power terminal Vinit11 as examples, the operation principles of one first pixel and one second pixel in one row in the embodiments of the present disclosure are described hereinafter. FIG. 17 shows a timing diagram of a signal terminal coupled to a pixel circuit. Referring to FIG. 17, it can be seen that the first potential is −6 V, and the second potential is 6V.

In the third phase t3, the potential of the reset signal supplied by the reset signal terminal Rst and the potential of the second gate drive signal supplied by the second gate signal terminal Gate2 are low potentials, and the potential of the light-emitting control signal supplied by the light-emitting control terminal EM and the potential of the first gate drive signal supplied by the first gate signal terminal Gate1 are high potentials. Accordingly, in the first pixel circuit 021 and the second pixel circuit 031, the third reset transistor T2 is turned on, the data write transistor T3, the compensation transistor T4, the first light-emitting control transistor T5, and the second light-emitting control transistor T6 are turned off, and the first reset transistor T11 in the first pixel circuit 021 and the second reset transistor T12 in the second pixel circuit 031 are turned off.

On this basis, in the third phase t3, in the first pixel circuit 021 and the second pixel circuit 031, the reset power signal supplied by the third reset power terminal Vinit2 is transmitted to the first node N1 through the turned on third reset transistor T2 to reset the first node N1 (that is, the gate electrode of the drive transistor T7). Thus, the drive transistor T7 is turned on. As such, the third phase t3 is referred to as a reset phase for resetting the first node N1, and the first pixel circuit 021 and the second pixel circuit 031 simultaneously reset the first node N1. FIG. 18 is an equivalent circuit diagram of a first pixel 021 and a second pixel 031 in a third phase t3. In addition, referring to FIG. 17, it can be seen that the potential of the reset power signal supplied by the third reset power terminal Vinit2 is −3.5 V, and the reset power signal is a direct-current signal.

Then, in the first phase t1, the potential of the first gate drive signal supplied by the first gate signal terminal Gate1 and the potential of the second gate drive signal supplied by the second gate signal terminal Gate2 are low potentials, and the potential of the light-emitting control signal supplied by the light-emitting control terminal EM and the potential of the reset signal supplied by the reset signal terminal Rst are high potentials. Accordingly, in the first pixel circuit 021 and the second pixel circuit 031, the data write transistor T3 and the compensation transistor T4 are turned on, the third reset transistor T2, the first light-emitting control transistor T5, and the second light-emitting control transistor T6 are turned off, the potential at the first node N1 is the low potential at first under the storage action of the storage capacitance Cst, and the drive transistor T7 is turned on. The first reset transistor T11 in the first pixel circuit 021 is turned on, and the second reset transistor T12 in the second pixel circuit 031 is turned off.

Figure 19:
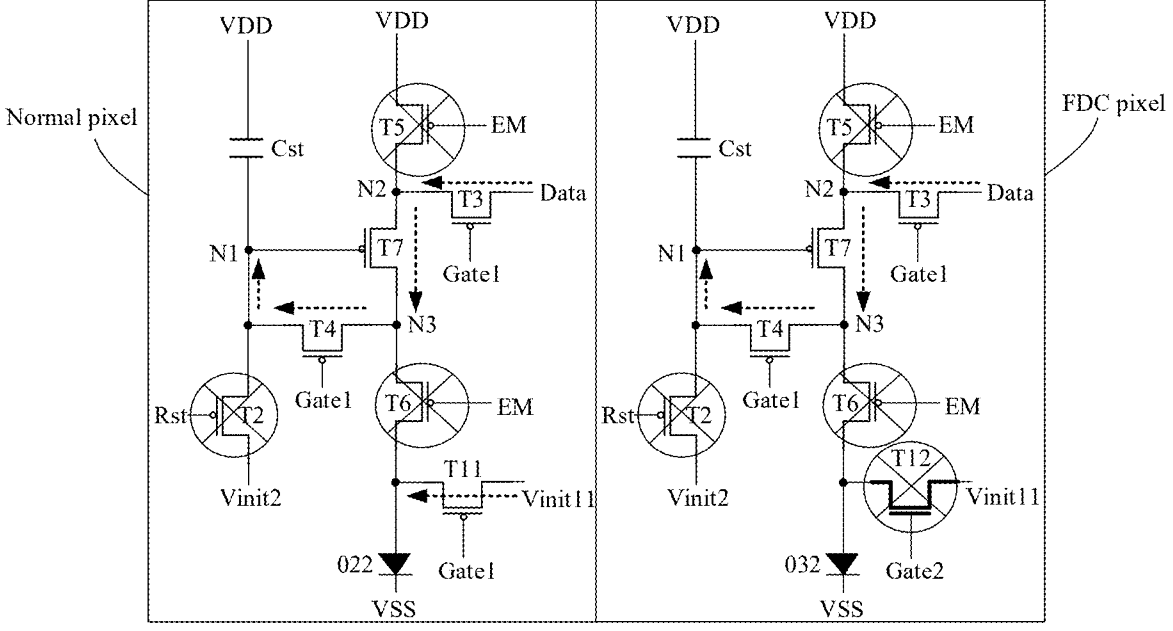
FIG. 19 is an equivalent circuit diagram of a first pixel and a second pixel in a first phase according to some embodiments of the present disclosure.

On this basis, in the first pixel circuit 021 and the second pixel circuit 031, the data signal supplied by the data signal terminal Date is transmitted to the second node N2 through the turned on data write transistor T3, and then transmitted to the third node N3 through the turned on drive transistor T7. Then, the turned on compensation transistor T4 adjusts the potential at the first node N1 based on the current potential at the third node N3, such that the potential finally transmitted to the first node N1 is only correlated with the data signal, and is not correlated with a threshold voltage of the drive transistor T7. In the first pixel circuit 021, the reset power signal supplied by the first reset power terminal Vinit11 is transmitted to the anode of the first light-emitting element 022 through the turned on first reset transistor T11 to reset the anode of the first light-emitting element 022. As such, the first phase t1 is referred to as a date write phase and a reset phase for resetting the anode of the first light-emitting element 022. FIG. 19 is an equivalent circuit diagram of a first pixel 021 and a second pixel 031 in a first phase t1. For example, as shown in FIG. 17, the potential of the reset power signal supplied by the first reset power terminal Vinit11 to the first light-emitting element 022 is −3 V, and the potential of the data signal ranges from 2 V to 4.5 V.

Then, in the second phase t2, the potential of the first gate drive signal supplied by the first gate signal terminal Gate1, the potential of the second gate drive signal supplied by the second gate signal terminal Gate2, the potential of the light-emitting control signal supplied by the light-emitting control terminal EM, and the potential of the reset signal supplied by the reset signal terminal Rst are high potentials. Accordingly, in the first pixel circuit 021 and the second pixel circuit 031, the third reset transistor T2, the data write transistor T3, the compensation transistor T4, the first light-emitting control transistor T5, and the second light-emitting control transistor T6 are turned off, the potential at the first node N1 is the potential in the first phase t1 under the storage action of the storage capacitance Cst, and the drive transistor T7 is turned on. The first reset transistor T11 in the first pixel circuit 021 is turned off, and the second reset transistor T12 in the second pixel circuit 031 is turned on.

Figure 20:
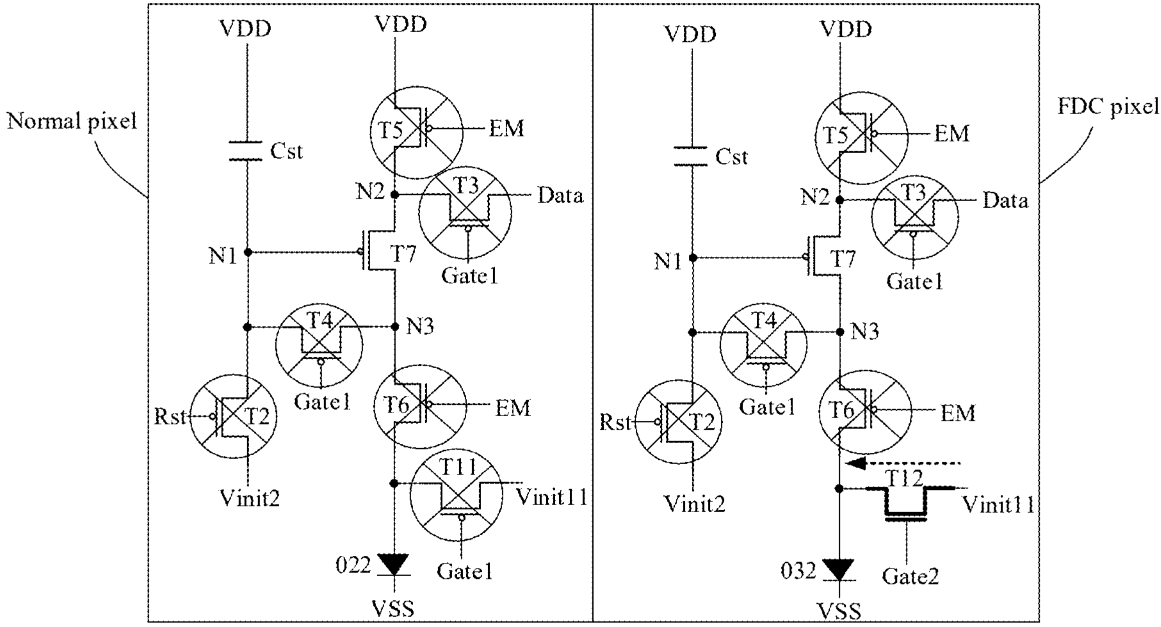
FIG. 20 is an equivalent circuit diagram of a first pixel and a second pixel in a second phase according to some embodiments of the present disclosure.

On this basis, only in the second pixel circuit 031, the reset power signal supplied by the second reset power terminal Vinit12 is transmitted to the anode of the second light-emitting element 032 through the turned on second reset transistor T12 to reset the anode of the second light-emitting element 032. As such, the second phase t2 is referred to as a reset phase for resetting the anode of the second light-emitting element 032. FIG. 20 is an equivalent circuit diagram of a first pixel 021 and a second pixel 031 in a second phase t2. For example, as shown in FIG. 17, the potential of the reset power signal supplied by the second reset power terminal Vinit12 to the second light-emitting element 032 is −2.5 V and is greater than the potential of the reset power signal transmitted to the first light-emitting element 022 in the first phase, and the potential of the reset power signal supplied by the reset power terminal Vinit11 is the alternating current signal. As such, the lighting time of the second light-emitting element 032 is shortened, and the problem of less lighting speed of the second light-emitting element 032 caused by the great capacitance of the anode is improved, such that the display effect of the display panel is improved.

It should be noted that in conjunction with FIG. 17, the first phase t1 and the second phase t2 are collectively referred to as a reset phase t00 for resetting the anode of the target light-emitting element. In addition, it can be further seen referring to FIG. 17 that in the embodiments of the present disclosure, the first pixel circuit 021 and the second pixel circuit 031 reset the anode of the coupled light-emitting element in different time, the first pixel circuit 021 resets the anode of the first light-emitting element 022 first, and then the second pixel circuit 031 resets the anode of the second light-emitting element 032. It can be seen in conjunction with above embodiments that in some embodiments, where the first reset power terminal Vinit11 and the second reset power terminal Vinit12 are separated, the first phase t1 and the second phase t2 are performed simultaneously, that is, the first light-emitting element 022 and the second light-emitting element 032 are reset simultaneously.

In the fourth phase, the potential of the light-emitting control signal supplied by the light-emitting control terminal EM and the potential of the second gate drive signal supplied by the second gate signal terminal Gate2 are low potentials, and the potential of the first gate drive signal supplied by the first gate signal terminal Gate1 and the potential of the reset signal supplied by the reset signal terminal Rst are high potentials. Accordingly, in the first pixel circuit 021 and the second pixel circuit 031, the first light-emitting control transistor T5 and the second light-emitting control transistor T6 are turned on, the third reset transistor T2, the data write transistor T3, and the compensation transistor T4 are turned off, the potential at the first node N1 is the potential at the first phase t2 under the storage action of the storage capacitance Cst, and the drive transistor T7 is turned on. The first reset transistor T11 in the first pixel circuit 021 and the second reset transistor T12 in the second pixel circuit 031 are turned off.

Figure 21:
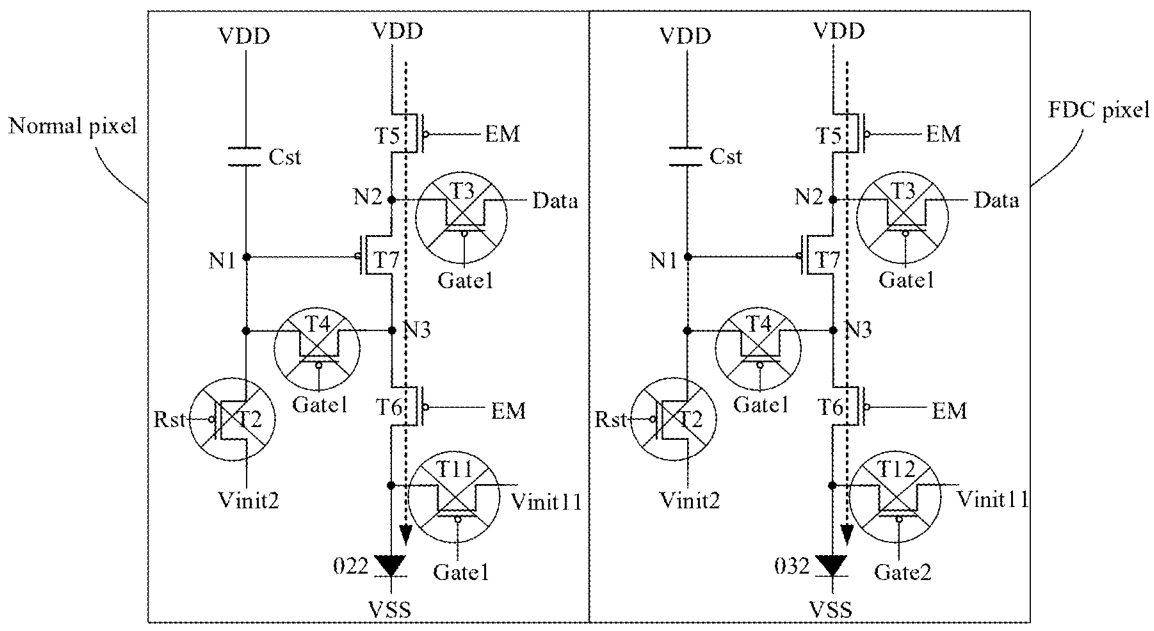
FIG. 21 is an equivalent circuit diagram of a first pixel and a second pixel in a fourth phase according to some embodiments of the present disclosure.

On this basis, in the second pixel circuit 031, the second power signal supplied by the second power terminal VDD are transmitted to the second node N2 through the turned on first light-emitting control transistor T5, the drive transistor T7 transmits the light-emitting drive signal to the third node N3 in response to the potential at the first node N1 and the potential at the second node N2, the light-emitting drive signal is then transmitted to the anode of the first light-emitting element 022 through the turned on second light-emitting control transistor T6. Furthermore, the first light-emitting element 022 emits the light under the action of the different in potential of the light-emitting drive signal and the first power signal supplied by the first power terminal VSS coupled to the cathode of the first light-emitting element 022. It should be noted that as the light-emitting drive signal is transmitted to the first light-emitting element 022 through the second light-emitting control transistor T6, the light-emitting drive signal generated by the drive transistor T7 and the light-emitting drive signal transmitted to the first light-emitting element 022 are different (such as, the potentials are different). The second pixel circuit 031 is in the same manner, which is not repeated herein. Thus, the fourth phase t4 is also referred to as the light-emitting display phase, and FIG. 21 is an equivalent circuit diagram of a first pixel 021 and a second pixel 031 in a fourth phase t4. It should be noted that the symbol "x" in FIG. 18 to FIG. 21 represents that the corresponding transistor is turned off.

In summary, a method for driving a pixel circuit is provide in the embodiments of the present disclosure. In the method, the first pixel circuit transmits the reset power signal to the first light-emitting element in the first phase, the second pixel circuit transmits the reset power signal to the second light-emitting element in the second phase, and the potential of reset power signal transmitted to the first light-emitting element is less than the potential of reset power signal transmitted to the second light-emitting element. As such, by flexibly setting the potential of the reset power signal, a problem of the less lighting speed caused by the great capacitance of the anode of the second light-emitting element is solved, such that the lighting speed of the second light-emitting element is equal to the lighting speed of the first light-emitting element as possible, and the display effect of the display panel is ensured to be great.

Figure 22:
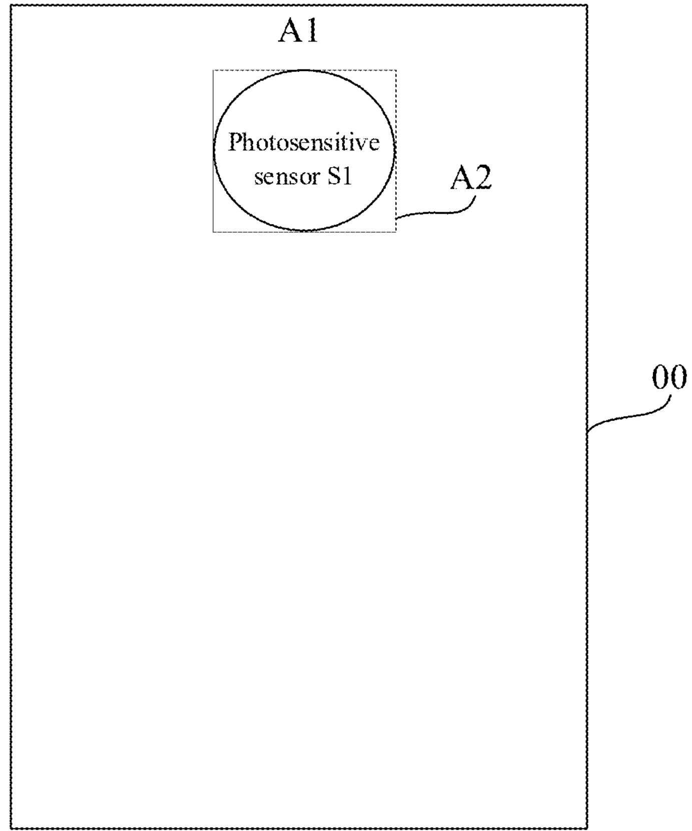
FIG. 22 is a schematic structural diagram of a display device according to some embodiments of the present disclosure.

FIG. 22 is a schematic structural diagram of a display device according to some embodiments of the present disclosure. As shown in FIG. 22, the display device includes: a photosensitive sensor S1, and the display panel according to above accompanying drawings.

In conjunction with FIG. 1, the photosensitive sensor S1 is disposed in a second display region A2 of the display panel 00. The photosensitive sensor S1 is configured to achieve a shooting function.

In some embodiments, the second display region A2 is rectangular-shaped, an area of an orthogonal projection of the photosensitive sensor S1 on the substrate 01 is less than or equal to an area of an inscribed circle of the second display region A2. That is, a size of a region of the photosensitive sensor S1 is less than or equal to a size of the inscribed circle of the second display region A2. For example, referring to FIG. 22, in the shown display device, the size of the region of the photosensitive sensor S1 is equal to the size of the inscribed circle of the second display region A2. That is, the region of the photosensitive sensor S1 is circle-shaped. Accordingly, the region of the photosensitive sensor S1 is also referred to as a transparent hole. In some embodiments, the second display region A2 is in other shape other than the rectangle, such as, the oval or the circle shown in FIG. 1.

It should be noted that the display device further includes an acoustic sensor. The acoustic sensor is disposed in the second display region A2, that is, the acoustic sensor is hidden below the screen of the display panel, such that the screen ratio of the display device is reliably improved. In some embodiments, other hardware structure, other than the photosensitive sensor and the acoustic sensor, of the display device is also disposed in the second display region A2.

In some embodiments, the display device in the embodiments of the present disclosure further includes a display drive circuit. The display drive circuit is coupled to the signal terminals coupled to the pixel circuits in the display panel to provide signals required by the signal terminals, for example, the signal meeting the timing shown in FIG. 17.

For example, the display drive circuit includes a gate drive circuit and a source drive circuit. The gate drive circuit is coupled to a first gate signal terminal Gate1 and a second gate signal terminal Gate2 (collectively referred to as the gate signal terminal) to provide a gate drive signal to the gate signal terminal. The source drive circuit is coupled to a data signal terminal Date to provide a data signal to the data signal terminal Date.

It should be noted that the display panel is provided with a plurality of gate lines, and the display drive circuit is coupled to the gate signal terminal coupled to the plurality of rows of pixel circuits via the plurality of gate lines. In addition, for $n^{th}$ row of pixel circuits in the plurality of rows of pixel circuits (including a first pixel circuit and a second pixel circuit), the display drive circuit is coupled to the first gate signal terminal Gate1 via a $n^{th}$ gate line, and is coupled to the second gate signal terminal Gate2 via the $(n+1)^{th}$ gate line. That is, the second gate signal terminal Gate2 coupled to $n^{th}$ row of second pixel circuit 031 is the first gate signal terminal Gate1 coupled to $(n+1)^{th}$ row of first pixel circuit 021. n is an integer greater than or equal to 1.

In some embodiments, the display device in the embodiments of the present disclosure is a product or a component with a display function, such as an organic light-emitting diode (OLED) display device, an active-matrix organic light-emitting diode (AMOLED) display device, a mobile phone, a tablet computer, a flexible display device, a television, a display.

The terms used in the embodiments of the present disclosure are intended only to explain the embodiments of the present disclosure, and are not intended to limit the present disclosure. Unless otherwise defined, the technical or scientific terms used in the embodiments of the present disclosure shall have the general meaning understood by those of ordinary skill in the art to which the present disclosure belongs.

The terms "first," "second," "third," and the like used in the description and claims of the present disclosure are not intended to indicate any order, quantity or importance, but are merely used to distinguish the different components.

the terms "one" or "a" and the like do not indicate the numerical limitation, but indicate the existence of at least one.

The terms "comprise," or "include," and the like are used to indicate that the element or object preceding the terms "comprise," or "include" covers the element or object following the terms "comprise," or "include" and its equivalents, and shall not be understood as excluding other elements or objects.

The terms "on," "under," "left," and "right" are only used to indicate the relative positional relationship. When the absolute position of the described object changes, the relative positional relationship may change accordingly. The terms "connect" or "contact" indicate electrical connections.

The term "and/or" may indicate three relationships. For example, A and/or B may indicate: A alone, A and B, and B clone. The symbol "/" generally indicates that the associated objects are in an "or" relationship.

Described above are example embodiments of the present disclosure, and are not intended to limit the present disclosure. Any modifications, equivalent replacements, improvements and the like made within the spirit and principles of the present disclosure should be included within the scope of protection of the present disclosure.

The invention claimed is:

1. A display panel, comprising:

a substrate, comprising a first display region and a second display region, wherein the first display region at least partially surrounds the second display region, the first display region is a non-transparent display region, and the second display region is a transparent display region;

a plurality of transparent conductive wires, disposed in the first display region and the second display region;

a plurality of first pixels, the first pixel being a normal pixel and comprising a first pixel circuit and a first light-emitting element, wherein the first pixel circuit and the first light-emitting element are disposed in the first display region, the first pixel circuit is coupled to the first light-emitting element, a first gate signal terminal, and a first reset power terminal, and the first pixel circuit is configured to control, in response to a first gate drive signal supplied by the first gate signal terminal, the first reset power terminal to transmit a reset power signal to the first light-emitting element;

a plurality of second pixels, the second pixel being a full display with camera (FDC) pixel and comprising a second pixel circuit and a second light-emitting element, wherein the second pixel circuit is disposed in the first display region, the second light-emitting element is disposed in the second display region, the second pixel circuit is coupled to the second light-emitting element via the transparent conductive wire and is further coupled to a second gate signal terminal and a second reset power terminal, and the second pixel circuit is configured to control, in response to a second gate drive signal supplied by the second gate signal terminal, the second reset power terminal to transmit a reset power signal to the second light-emitting element;

wherein the first reset power terminal and the second reset power terminal are a same reset power terminal, a reset power signal supplied by the same reset power terminal is an alternating current signal, and the first pixel circuit and the second pixel circuit transmit different reset power signals to coupled light-emitting elements in a time-sharing manner, such that a potential of the reset power signal supplied by the same reset power terminal to the first light-emitting element is less than a potential of the reset power signal supplied by the same reset power terminal to the second light-emitting element; and the first pixel circuit comprises a first reset circuit, the first reset circuit is coupled to the first gate signal terminal, the first reset power terminal, and a first electrode of the first light-emitting element, and is configured to control, in response to the first gate drive signal, the first reset power terminal to transmit the reset power signal to the first electrode of the first light-emitting element; the second pixel circuit comprises a second reset circuit, the second reset circuit is coupled to the second gate signal terminal, the second reset power terminal, and a first electrode of the second light-emitting element, and is configured to control, in response to the second gate drive signal, the second reset power terminal to transmit the reset power signal to the first electrode of the second light-emitting element, wherein the first electrode of the first light-emitting element and the first electrode of the second light-emitting element are coupled to a first power terminal; wherein the first reset circuit comprises a first reset transistor, and the second reset circuit comprises a second reset transistor, wherein the first reset transistor and the second reset transistor are controlled separately to reset the first light-emitting element and the second light-emitting element in the time-sharing manner, such that different reset power signals are transmitted to the first light-emitting element and the second light-emitting element wherein the first reset transistor is a P-type transistor and belongs to the normal pixel, and the second reset transistor is an N-type transistor and belongs to the FDC pixel;

a gate electrode of the first reset transistor is coupled to the first gate signal terminal, a first electrode of the first reset transistor is coupled to the first reset power terminal, and a second electrode of the first reset transistor is coupled to the first electrode of the first light-emitting element; and a gate electrode of the second reset transistor is coupled to the second gate signal terminal, a first electrode of the second reset transistor is coupled to the second reset power terminal, and a second electrode of the second reset transistor is coupled to the first electrode of the second light-emitting element.

2. The display panel according to claim 1, wherein the first pixel circuit comprises a first light-emitting drive circuit, and the second pixel circuit comprises a second light-emitting drive circuit; wherein the first light-emitting drive circuit is coupled to the first gate signal terminal, a data signal terminal, and the first electrode of the first light-emitting element, and is configured to transmit, in response to the first gate drive signal and a data signal supplied by the data signal terminal, a light-emitting drive signal to the first electrode of the first light-emitting element to drive the first light-emitting element to emit light; and the second light-emitting drive circuit is coupled to the first gate signal terminal, the data signal terminal, and the first electrode of the second light-emitting element, and is configured to transmit, in response to the first gate drive signal and the data signal, a light-emitting drive signal to the first electrode of the second light-emitting element to drive the second light-emitting element to emit light.

3. The display panel according to claim 1, wherein the first reset transistor comprises a first active layer, a first gate metal layer, and a first source-drain metal layer that are laminated in a direction away from the substrate, wherein the first active layer is coupled to the first source-drain metal layer; and the second reset transistor comprises a second gate metal layer, a second active layer, a third gate metal layer, and a second source-drain metal layer that are laminated in the direction away from the substrate, wherein the second source-drain metal layer is coupled to the second active layer;

wherein the first source-drain metal layer and the second source-drain metal layer are disposed in a same layer, and the second gate metal layer is farther away from the substrate than the first gate metal layer.

4. The display panel according to claim 3, wherein a material of the first active layer comprises a low temperature poly-silicon material, and a material of the second active layer comprises an oxide material.

5. The display panel according to claim 1, wherein the first light-emitting drive circuit comprises a first reset sub-circuit, a first data write sub-circuit, a first light-emitting control sub-circuit, a first storage sub-circuit, and a first drive sub-circuit; and the second light-emitting drive circuit comprises a second reset sub-circuit, a second data write sub-circuit, a second light-emitting control sub-circuit, a second storage sub-circuit, and a second drive sub-circuit; wherein each of the first reset sub-circuit and the second reset sub-circuit is coupled to a reset signal terminal, a third reset power terminal, and a first node, and is configured to control, in response to a reset signal supplied by the reset signal terminal, the third reset power terminal and the first node to be turned on or turned off;

each of the first data write sub-circuit and the second data write sub-circuit is coupled to the first gate signal terminal, a data signal terminal, the first node, a second node, and a third node, and is configured to control, in response to the first gate drive signal, the data signal terminal and the second node to be turned on or turned off and the third node and the first node to be turned on or turned off;

each of the first light-emitting control sub-circuit and the second light-emitting control sub-circuit is coupled to a light-emitting control terminal, a second power terminal, the second node, the third node, and a first electrode of a target light-emitting element, and is configured to control, in response to a light-emitting control signal supplied by the light-emitting control terminal, the second power terminal and the second node to be turned on or turned off and the third node and the first electrode of the target light-emitting element to be turned on or turned off, a second electrode of the target light-emitting element is coupled to the second power terminal, the target light-emitting element in the first pixel circuit is the first light-emitting element, and the target light-emitting element in the second pixel circuit is the second light-emitting element;

each of the first storage sub-circuit and the second storage sub-circuit is coupled to the second power terminal and the first node, and is configured to store, in response to a second power signal supplied by the second power terminal, a potential at the first node; and each of the first drive sub-circuit and the second drive sub-circuit is coupled to the first node, the second node, and the third node, and is configured to transmit, in response to the potential at the first node and a potential at the second node, a light-emitting drive signal to the third node.

6. The display panel according to claim 5, wherein each of the first reset sub-circuit and the second reset sub-circuit comprises: a third reset transistor, each of the first data write sub-circuit and the second data write sub-circuit comprises: a data write transistor and a compensation transistor, each of the first light-emitting control sub-circuit and the second light-emitting control sub-circuit comprises: a first light-emitting control transistor and a second light-emitting control transistor, each of the first storage sub-circuit and the second storage sub-circuit comprises: a storage capacitance, and each of the first drive sub-circuit and the second drive sub-circuit comprises: a drive transistor; wherein a gate electrode of the third reset transistor is coupled to the reset signal terminal, a first electrode of the third reset transistor is coupled to the third reset power terminal, and a second electrode of the third reset transistor is coupled to the first node;

a gate of the data write transistor is coupled to the first gate signal terminal, a first electrode of the data write transistor is coupled to the data signal terminal, and a second electrode of the data write transistor is coupled to the second node;

a gate of the compensation transistor is coupled to the first gate signal terminal, a first electrode of the compensation transistor is coupled to the third node, and a second electrode of the compensation transistor is coupled to the first node;

one terminal of the storage capacitance is coupled to the second power terminal, and the other terminal of the storage capacitance is coupled to the first node;

a gate electrode of the first light-emitting control transistor is coupled to the light-emitting control terminal, a first electrode of the first light-emitting control transistor is coupled to the second power terminal, and a second electrode of the first light-emitting control transistor is coupled to the second node;

a gate electrode of the second light-emitting control transistor is coupled to the light-emitting control terminal, a first electrode of the second light-emitting control transistor is coupled to the third node, and a second electrode of the second light-emitting control transistor is coupled to the first electrode of the target light-emitting element; and a gate electrode of the drive transistor is coupled to the first node, a first electrode of the drive transistor is coupled to the second node, and a second electrode of the drive transistor is coupled to the third node.

7. The display panel according to claim 6, wherein the third reset transistor, the data write transistor, the compensation transistor, the first light-emitting control transistor, the second light-emitting control transistor, and the drive transistor are P-type transistors;

or the data write transistor, the first light-emitting control transistor, the second light-emitting control transistor, and the drive transistor are P-type transistors, and the third reset transistor and the compensation transistor are N-type transistors.

8. The display panel according to claim 1, wherein a material of the transparent conductive wire comprises an indium tin oxide material.

9. A method for driving a pixel circuit, applicable to driving the first pixel circuit and the second pixel circuit in the display panel as defined in claim 1, the method comprising:

in a first phase in which a potential of a first gate drive signal supplied by a first gate signal terminal and a potential of a second gate drive signal supplied by a second gate signal terminal are a first potential, in response to the first gate drive signal, transmitting, by the first pixel circuit, a reset power signal supplied by a first reset power terminal to a first light-emitting element to reset the first light-emitting element; and in a second phase in which the potential of the first gate drive signal and the potential of the second gate drive signal are a second potential, in response to the second gate drive signal, transmitting, by the second pixel circuit, a reset power signal supplied by a second reset power terminal to a second light-emitting element to reset the second light-emitting element;

wherein a potential of the reset power signal transmitted to the first light-emitting element is less than a potential of the reset power signal transmitted to the second light-emitting element.

10. The method according to claim 9, wherein prior to the first phase, the method further comprises:

in a third phage in which a potential of a reset signal and the potential of the second gate drive signal are the first potential and a potential of a light-emitting control signal and the potential of the first gate drive signal are the second potential, in response to the reset signal, transmitting, by a reset sub-circuit, a reset power signal supplied by a third reset power terminal to a first node to reset the first node;

upon the second phase, the method further comprises:

in a fourth phase in which the potential of the light-emitting control signal and the potential of the second gate drive signal are the first potential and the potential of the reset signal and the potential of the first gate drive signal are the second potential, in response to the light-emitting control signal, controlling, by a light-emitting control sub-circuit, a second power terminal and a second node to be turned on and a third node and a first electrode of a target light-emitting element to be turned on, and in response to a potential at the first node and a potential at the second node, transmitting, by a drive sub-circuit, a light-emitting drive signal to the third node, wherein the target light-emitting element in the first pixel circuit is the first light-emitting element, and the target light-emitting element in the second pixel circuit is the second light-emitting element; and in the first phase, the potential of the light-emitting control signal and the potential the reset signal are the second potential, and in response to the first gate drive signal, a data write sub-circuit controls a data signal terminal and the second node to be turned on and the third node and the first node to be turned on.

11. A display device, comprising: a photosensitive sensor, and a display panel, wherein the display panel comprises:

a substrate, comprising a first display region and a second display region, wherein the first display region at least partially surrounds the second display region, the first display region is a non-transparent display region, and the second display region is a transparent display region;

a plurality of transparent conductive wires, disposed in the first display region and the second display region;

a plurality of first pixels, the first pixel being a normal pixel and comprising a first pixel circuit and a first light-emitting element, wherein the first pixel circuit and the first light-emitting element are disposed in the first display region, the first pixel circuit is coupled to the first light-emitting element, a first gate signal terminal, and a first reset power terminal, and the first pixel circuit is configured to control, in response to a first gate drive signal supplied by the first gate signal terminal, the first reset power terminal to transmit a reset power signal to the first light-emitting element;

a plurality of second pixels, the second pixel being a full display with camera (FDC) pixel and comprising a second pixel circuit and a second light-emitting element, wherein the second pixel circuit is disposed in the first display region, the second light-emitting element is disposed in the second display region, the second pixel circuit is coupled to the second light-emitting element via the transparent conductive wire and is further coupled to a second gate signal terminal and a second reset power terminal, and the second pixel circuit is configured to control, in response to a second gate drive signal supplied by the second gate signal terminal, the second reset power terminal to transmit a reset power signal to the second light-emitting element;

wherein the first reset power terminal and the second reset power terminal are a same reset power terminal, a reset power signal supplied by the same reset power terminal is an alternating current signal, and the first pixel circuit and the second pixel circuit transmit different reset power signals to coupled light-emitting elements in a time-sharing manner, such that a potential of the reset power signal supplied by the same reset power terminal to the first light-emitting element is less than a potential of the reset power signal supplied by the same reset power terminal to the second light-emitting element; and the first pixel circuit comprises a first reset circuit, the first reset circuit is coupled to the first gate signal terminal, the first reset power terminal, and a first electrode of the first light-emitting element, and is configured to control, in response to the first gate drive signal, the first reset power terminal to transmit the reset power signal to the first electrode of the first light-emitting element; the second pixel circuit comprises a second reset circuit, the second reset circuit is coupled to the second gate signal terminal, the second reset power terminal, and a first electrode of the second light-emitting element, and is configured to control, in response to the second gate drive signal, the second reset power terminal to transmit the reset power signal to the first electrode of the second light-emitting element, wherein the first electrode of the first light-emitting element and the first electrode of the second light-emitting element are coupled to a first power terminal; wherein the first reset circuit comprises a first reset transistor, and the second reset circuit comprises a second reset transistor, wherein the first reset transistor and the second reset transistor are controlled separately to reset the first light-emitting element and the second light-emitting element in the time-sharing manner, such that different reset power signals are transmitted to the first light-emitting element and the second light-emitting element;

wherein the first reset transistor is a P-type transistor and belongs to the normal pixel, and the second reset transistor is an N-type transistor and belongs to the FDC pixel, a gate electrode of the first reset transistor is coupled to the first gate signal terminal, a first electrode of the first reset transistor is coupled to the first reset power terminal, and a second electrode of the first reset transistor is coupled to the first electrode of the first light-emitting element; and a gate electrode of the second reset transistor is coupled to the second gate signal terminal, a first electrode of the second reset transistor is coupled to the second reset power terminal, and a second electrode of the second reset transistor is coupled to the first electrode of the second light-emitting element; and the photosensitive sensor is disposed in the second display region of the display panel.

12. The display device according to claim 11, wherein the first pixel circuit comprises a first light-emitting drive circuit, and the second pixel circuit comprises a second light-emitting drive circuit; wherein the first light-emitting drive circuit is coupled to the first gate signal terminal, a data signal terminal, and the first electrode of the first light-emitting element, and is configured to transmit, in response to the first gate drive signal and a data signal supplied by the data signal terminal, a light-emitting drive signal to the first electrode of the first light-emitting element to drive the first light-emitting element to emit light; and the second light-emitting drive circuit is coupled to the first gate signal terminal, the data signal terminal, and the first electrode of the second light-emitting element, and is configured to transmit, in response to the first gate drive signal and the data signal, a light-emitting drive signal to the first electrode of the second light-emitting element to drive the second light-emitting element to emit light.

13. The display device according to claim 12, wherein a gate electrode of the first reset transistor is coupled to the first gate signal terminal, a first electrode of the first reset transistor is coupled to the first reset power terminal, and a second electrode of the first reset transistor is coupled to the first electrode of the first light-emitting element; and a gate electrode of the second reset transistor is coupled to the second gate signal terminal, a first electrode of the second reset transistor is coupled to the second reset power terminal, and a second electrode of the second reset transistor is coupled to the first electrode of the second light-emitting element.

14. The display device according to claim 11, wherein the first reset transistor comprises a first active layer, a first gate metal layer, and a first source-drain metal layer that are laminated in a direction away from the substrate, wherein the first active layer is coupled to the first source-drain metal layer; and the second reset transistor comprises a second gate metal layer, a second active layer, a third gate metal layer, and a second source-drain metal layer that are laminated in the direction away from the substrate, wherein the second source-drain metal layer is coupled to the second active layer;

wherein the first source-drain metal layer and the second source-drain metal layer are disposed in a same layer, and the second gate metal layer is farther away from the substrate than the first gate metal layer.

* * * * *